(12) United States Patent
Chan et al.

(10) Patent No.: US 8,751,459 B2
(45) Date of Patent: Jun. 10, 2014

(54) METHOD AND SYSTEM TO ANALYZE EMAIL ADDRESSES

(75) Inventors: Stephen Chan, Los Altos Hills, CA (US); Edbert Chan, Los Altos Hills, CA (US)

(73) Assignee: App Tsunami, Inc., Los Altos, CA (US)

( * ) Notice: Subject to any disclaimer, the term of this patent is extended or adjusted under 35 U.S.C. 154(b) by 65 days.

(21) Appl. No.: 13/480,217

(22) Filed: May 24, 2012

(65) Prior Publication Data

US 2013/0318098 A1    Nov. 28, 2013

(51) Int. Cl.
*G06F 17/30* (2006.01)

(52) U.S. Cl.
USPC .......................................................... 707/683

(58) Field of Classification Search
USPC .......................................................... 707/602
See application file for complete search history.

(56) References Cited

U.S. PATENT DOCUMENTS

2010/0312837 A1*  12/2010  Bodapati et al. ............... 709/206

* cited by examiner

*Primary Examiner* — Baoquoc N To
(74) *Attorney, Agent, or Firm* — Foley & Lardner LLP; Alex Nie

(57) ABSTRACT

Website and newsletter operators may only have users' email addresses but not their person names. It can be beneficial for such operators to derive additional information about the email address owners so they can improve their services. However, there is no easy way to retrieve owners' information based on only email addresses. The present disclosure provides information such as the owners' names, professional profiles and aggregated statistics with only a list of email addresses as the input.

19 Claims, 21 Drawing Sheets

101

| ID | Weight | minFNC | Part 1 | Part 2 | Example |
|---|---|---|---|---|---|
| NC2S01 | 1 | 1 | Given name | | john |
| NC2S02 | 1 | 1 | Given name | First letter of surname | johnd |
| NC2S03 | 1 | 2 | Given name | Surname | johndoe |
| NC2S04 | 1 | 1 | First initial | Surname | jdoe |
| NC2S05 | 1 | 1 | Surname | | doe |
| NC2S06 | 1 | 1 | Surname | First letter of given name | doej |
| NC2S07 | 1 | 2 | Surname | Given name | doejohn |
| NC2S08 | 1 | 1 | First letter of surname | Given name | djohn |

102

| ID | Weight | minFNC | Part 1 | Part 2 | Part 3 | Example |
|---|---|---|---|---|---|---|
| NC3S01 | 1 | 3 | Given name | Middle name | Surname | johnsamdoe |
| NC3S02 | 1 | 2 | Given name | First letter of middle name | Surname | johnsdoe |
| NC3S03 | 1 | 1 | First letter of given name | First letter of middle name | Surname | jsdoe |
| NC3S04 | 1 | 3 | Surname | Given name | Middle name | doejohnsam |
| NC3S05 | 1 | 2 | Surname | Given name | First letter of middle name | doejohns |
| NC3S06 | 1 | 1 | Surname | First letter of given name | First letter of middle name | doejs |

101

| ID | Weight | minFNC | Part 1 | Part 2 | Example |
|---|---|---|---|---|---|
| NC2S01 | 1 | 1 | Given name | | john |
| NC2S02 | 1 | 1 | Given name | First letter of surname | johnd |
| NC2S03 | 1 | 2 | Given name | Surname | johndoe |
| NC2S04 | 1 | 1 | First initial | Surname | jdoe |
| NC2S05 | 1 | 1 | Surname | | doe |
| NC2S06 | 1 | 1 | Surname | First letter of given name | doej |
| NC2S07 | 1 | 2 | Surname | Given name | doejohn |
| NC2S08 | 1 | 1 | First letter of surname | Given name | djohn |

102

| ID | Weight | minFNC | Part 1 | Part 2 | Part 3 | Example |
|---|---|---|---|---|---|---|
| NC3S01 | 1 | 3 | Given name | Middle name | Surname | johnsamdoe |
| NC3S02 | 1 | 2 | Given name | First letter of middle name | Surname | johnsdoe |
| NC3S03 | 1 | 1 | First letter of given name | First letter of middle name | Surname | jsdoe |
| NC3S04 | 1 | 3 | Surname | Given name | Middle name | doejohnsam |
| NC3S05 | 1 | 2 | Surname | Given name | First letter of middle name | doejohns |
| NC3S06 | 1 | 1 | Surname | First letter of given name | First letter of middle name | doejs |

| ID | Weight | minFNC | Part 1 | punctuation character | Part 2 | Example |
|---|---|---|---|---|---|---|
| NC2M01 | 1 | 1 | Given name | | Surname | john.doe |
| NC2M02 | 1 | 1 | Given name | | First letter of surname | john.d |
| NC2M03 | 1 | 1 | First letter of given name | | Surname | j.doe |
| NC2M04 | 1 | 1 | Surname | | Given name | doe.john |
| NC2M05 | 1 | 1 | Surname | | First letter of surname | doe.j |
| NC2M06 | 1 | 1 | First letter of surname | | Given name | d.john |

202

| ID | Weight | minFNC | Part 1 | punctuation character | Part 2 | punctuation character | Part 3 | Example |
|---|---|---|---|---|---|---|---|---|
| NC3M01 | 1 | 1 | Given name | | Middle name | | Surname | john.sam.doe |
| NC3M02 | 1 | 1 | Given name | | First letter of middle name | | Surname | john.s.doe |
| NC3M03 | 1 | 1 | First letter of given name | | First letter of middle name | | Surname | j.s.doe |
| NC3M04 | 1 | 1 | Surname | | Given name | | Middle name | doe.john.sam |
| NC3M05 | 1 | 1 | Surname | | Given name | | First letter of middle name | doe.john.s |
| NC3M06 | 1 | 1 | Surname | | First letter of given name | | First letter of middle name | doe.j.s |

203

| Punctuation Character | Description |
|---|---|
| "." | period |
| "_" | underscore |
| "-" | hyphen |

FIG. 2

```
name,rank,count,prop100k,cum_prop100k,pctwhite,pctblack,pctapi,pctaian,pct2prace,pcthispanic
SMITH,1,2376206,880.85,880.85,73.35,22.22,0.40,0.85,1.63,1.56
JOHNSON,2,1857160,688.44,1569.30,61.55,33.80,0.42,0.91,1.82,1.50
WILLIAMS,3,1534042,568.66,2137.96,48.52,46.72,0.37,0.78,2.01,1.60
BROWN,4,1380145,511.62,2649.58,60.71,34.54,0.41,0.83,1.86,1.64
JONES,5,1362755,505.17,3154.75,57.69,37.73,0.35,0.94,1.85,1.44
MILLER,6,1127803,418.07,3572.82,85.81,10.41,0.42,0.63,1.31,1.43
DAVIS,7,1072335,397.51,3970.33,64.73,30.77,0.40,0.79,1.73,1.58
GARCIA,8,858289,318.17,4288.50,6.17,0.49,1.43,0.58,0.51,90.81
RODRIGUEZ,9,804240,298.13,4586.62,5.52,0.54,0.58,0.24,0.41,92.70
WILSON,10,783051,290.27,4876.90,69.72,25.32,0.46,1.03,1.74,1.73
```

301 — surname file

| Field | Description |
|---|---|
| name | Last name |
| rank | Rank |
| count | Number of occurrences |
| prop100k | Proportion per 100,000 people for name |
| cum_prop100k | Cumulative proportion per 100,000 people |
| pctwhite | Percent Non-Hispanic White Only |
| pctblack | Percent Non-Hispanic Black Only |
| pctapi | Percent Non-Hispanic Asian and Pacific Islander Only |
| pctaian | Percent Non-Hispanic American Indian and Alaskan Native Only |
| pct2prace | Percent Non-Hispanic of Two or More Races |
| pcthispanic | Percent Hispanic Origin | surname file data field descriptions

FIG. 3

401 — female given name file

| name | freq | cum.freq | rank |
|------|------|----------|------|
| MARY | 2.629 | 2.629 | 1 |
| PATRICIA | 1.073 | 3.702 | 2 |
| LINDA | 1.035 | 4.736 | 3 |
| BARBARA | 0.980 | 5.716 | 4 |
| ELIZABETH | 0.937 | 6.653 | 5 |
| JENNIFER | 0.932 | 7.586 | 6 |
| MARIA | 0.828 | 8.414 | 7 |
| SUSAN | 0.794 | 9.209 | 8 |
| MARGARET | 0.768 | 9.976 | 9 |
| DOROTHY | 0.727 | 10.703 | 10 |

402 — male given name file

| name | freq | cum.freq | rank |
|------|------|----------|------|
| JAMES | 3.318 | 3.318 | 1 |
| JOHN | 3.271 | 6.589 | 2 |
| ROBERT | 3.143 | 9.732 | 3 |
| MICHAEL | 2.629 | 12.361 | 4 |
| WILLIAM | 2.451 | 14.812 | 5 |
| DAVID | 2.363 | 17.176 | 6 |
| RICHARD | 1.703 | 18.878 | 7 |
| CHARLES | 1.523 | 20.401 | 8 |
| JOSEPH | 1.404 | 21.805 | 9 |
| THOMAS | 1.380 | 23.185 | 10 |

| Field | Description |
|-------|-------------|
| name | Given name |
| freq | Frequency in percent |
| cum.freq | Cumulative Frequency in percent |
| rank | Rank: "1" means the most popular name | data field descriptions

FIG. 4

METHOD AND SYSTEM TO ANALYZE EMAIL ADDRESSES

FIELD OF THE DISCLOSURE

The present disclosure relates to computer methods and systems to analyze email addresses to provide information about the owners of the email addresses.

BACKGROUND

A person's email address is a popular way to identify the person. Many newsletter operators only require an email address from a person to subscribe to a newsletter. Some website operators only require a user to provide an email address as the login identifier and the first name and last name are not required. It would be helpful for these operators to get some information about their users, e.g., genders, ethnic origins, geographic locations, job positions and industries. Such information can be used by the operator to improve services.

The limitation is that these operators only have the email addresses of their users but not their person names and most traditional profile databases do not support using email address as the search key. Some commercial service providers offer services to look up people by their email addresses. Examples of such service providers include Corporate Yellow Book, Jigsaw, Netprospex, Zoominfo, Emailfinder, Spokeo and Rapleaf. Their approach is to build up and maintain a proprietary database using government records, public records, public web sites, social website membership data, manual user submission and/or various online tracking technologies such as web browser cookies.

The approach of these commercial service providers has several challenges. The first challenge is that it requires significant time and effort to accumulate a database large enough to be useful. As a result many of them have only a relatively small number of email addresses and no service provider can guarantee that it can locate every email address. The second challenge is that it requires recurring effort to keep the database up-to-date. People change their email addresses but the data sources that these service providers originally rely upon to find the email addresses often do not get updated. Therefore the service providers have to cross-reference different data sources at different times to identify a person and update their records. The third challenge is that online tracking technologies can raise privacy concerns as witnessed by privacy-related lawsuits against some of these commercial service providers.

SUMMARY

An embodiment of the present disclosure provides methods to analyze an email address list to generate candidate owner names. Optionally, these candidate names can be used as look up keys to search additional data sources to generate profile information. Further, when analyzing a list of email addresses, such an approach provides aggregated statistics for owners of the email addresses in the list. Moreover, computer devices configured to carry out such methods, and computer-readable medium containing program code for implementing such methods are also provided.

In one embodiment, provided is a method for analyzing an email address, comprising: (a) isolating the user name from the email address; (b) extracting one or more strings from the user name which, in combination, represent a candidate full name of the owner of the email address; (c) comparing each of the one or more strings to a table comprising a plurality of real world name components and, for each real world name component, a use frequency, thereby obtaining a use frequency for each string; (d) calculating a likelihood score for the candidate full name to be a real world full name, which calculation takes the use frequencies obtained from step (c) as input; (e) repeating steps (b)-(d) to generate likelihood scores for a plurality of candidate full names each as a combination of different strings obtained by extracting one or more different strings from the user name; and (f) identifying the candidate full name, from the plurality of candidate full names, that has the highest likelihood score as an approximate full name of the owner of the email address, wherein at least one of steps (a)-(f) is performed by a computer.

In one aspect, one, or alternatively two, or more strings are extracted from the user name. In one such aspect, the one, or two, or more strings are obtained by dividing the characters in the user name.

In one aspect, the calculation of the likelihood score further employs a name recognition algorithm. In another aspect, the calculation of the likelihood score further comprises increasing the likelihood score if two or more strings are separated by a special character. In some aspects, the special character is a dot (".") or an underscore sign ("_").

In one aspect, a likelihood score is calculated for each order of combining the strings and each of the strings is compared to a table comprising a plurality of real world name components and, for each real world name component, a use frequency for the name component to be used at the position corresponding to the position of the string in the combination. In one aspect, the likelihood score of the candidate full name is the highest likelihood score among the likelihood scores calculated for all different orders of combining the strings.

In one aspect, the method further comprises, before step (b), removing digits and/or non-conventional characters from the user name.

In one aspect, the method further comprises querying a profile database with the identified approximate full name, wherein the profile database comprises profiles for a plurality of persons. In one aspect, the query is further conducted with the domain name extracted from the email address or the name of an organization associated with the domain name. In one aspect, a match between the identified approximate full name and an entry in the database further confirms the validity of the identified approximate full name.

In one aspect, the method further comprises querying a demographic database with the matched profile of the identified approximate full name to obtain demographic statistics. The method of any of the above embodiment can be applied to one or more email addresses of an email list, thereby generating demographic statistics for the email list.

BRIEF DESCRIPTION OF THE DRAWING

The figures of the accompanying drawings describe provided embodiments by way of illustration only, in which:

FIG. 1 illustrates a variety of email address naming conventions;

FIG. 2 illustrates additional email address naming conventions;

FIG. 3 shows an excerpt of surname statistics taken from the U.S. 2000 Census;

FIG. 4 shows excerpts of given name statistics from the U.S. 1990 Census;

Figure 5:
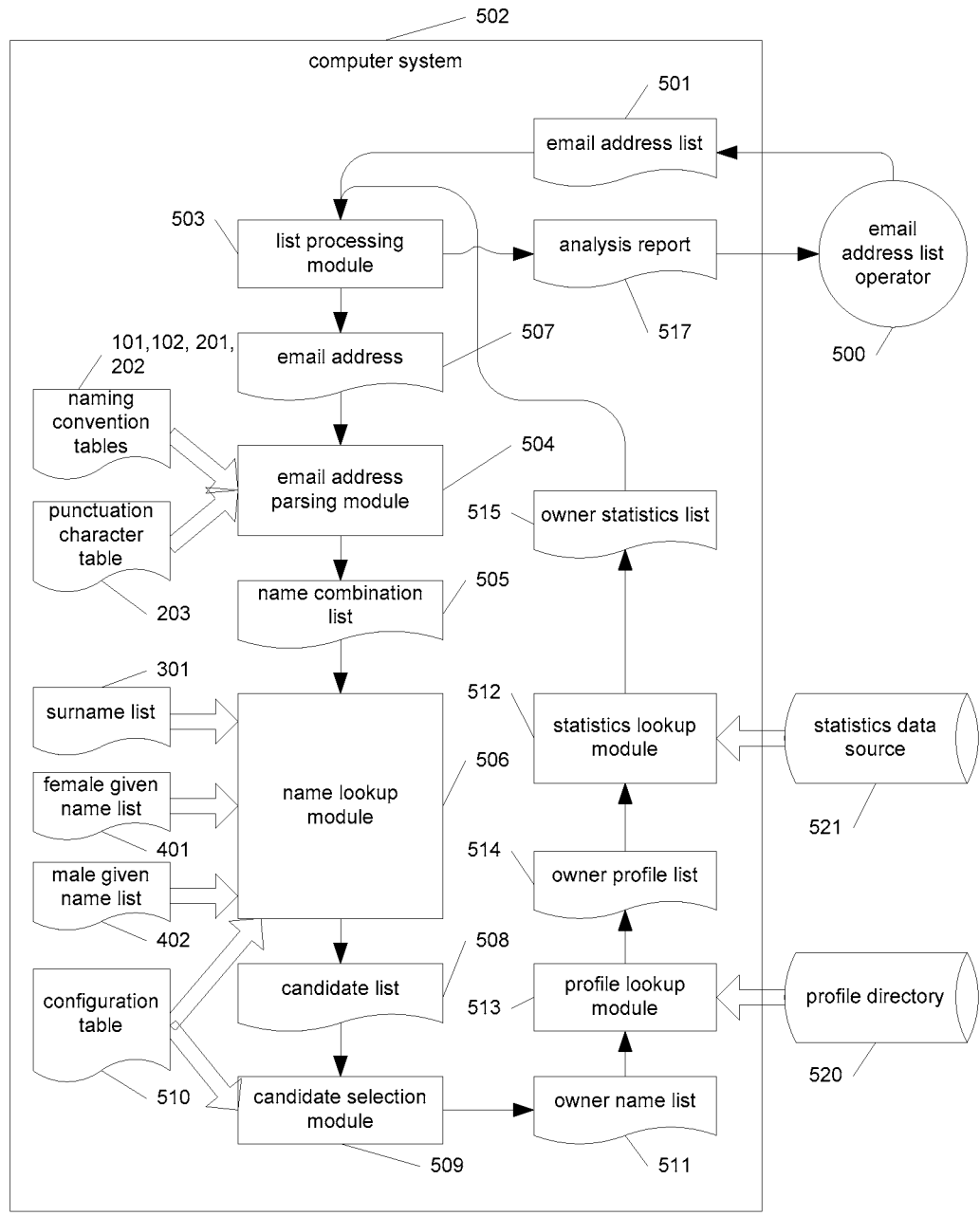
FIG. 5 is a block diagram illustrating an embodiment of the present disclosure.

Some or all of the figures are schematic representations for exemplification; hence, they do not necessarily depict the actual relative sizes or locations of the elements shown. The figures are presented for the purpose of illustrating one or more embodiments with the explicit understanding that they will not be used to limit the scope or the meaning of the claims that follow below.

DETAILED DESCRIPTION OF THE DISCLOSURE

Definitions

"Email address list operator" as used here refers to an entity in possession of a list of email addresses and has the rights to use the email addresses for the purposes described here. An example of email address list operator is a newsletter operator that has the email addresses of its subscribers.

"Email address syntax standards" as used here refer to formal syntax that email addresses have to conform to. Every email address must follow some formal email address syntax in order for an email to be handled properly. Popular email address syntax standards include SMTP and ISO X.400. An example of SMTP email address is "johndoe@domainname". Examples of ISO X.400 email addresses include "/O=organization/OU=department/CN=recipients/CN=johndoe" and "/O=organization/OU=department/CN=recipients/CN=johndoe@domainname".

"Domain name" as used here refers to SMTP domain names defined by IETF RFC 821 and its successors. An example of domain name in the real world is "ibm.com". In the above example, "domainname" is the domain name of the email addresses.

"User name" as used here refers to the part of the email address that uniquely identifies a user registered at the domain name. In the examples above, "johndoe" is the user name of the email addresses. Email address syntax standards are thoroughly documented and designed in such a way that the user name portion can be readily extracted in an automated manner.

"Owner" of an email address as used here refers to the person who uses the email address for sending and receiving emails. In the examples above, "John Doe" is the name of the owner of the email address.

"Name component" as used here refers to a component that makes up a person's name. Different cultures have different name components. For the majority of the U.S. population, name components include the first name, the middle name and the last name. In the examples above, "John" and "Doe" are name components.

"Full name component" as used here refers to a name component with more than one alphabetical letter.

"Abbreviated name component" as used here refers to a name component with one alphabetical letter.

"Anonymous statistics" as used here refers to statistical data that cannot be used to draw conclusion about any specific individual. For example, the published U.S. Census statistics are anonymous statistics.

"Name-based statistics" as used here refers to statistics that can be retrieved with only one name component. One example is the U.S. 2000 Census Bureau surname list that shows the ethnic origin probability distribution of a last name in the U.S. Because it is typically not possible to uniquely identify a person with only one name component, name-based statistics are anonymous statistics.

"Anonymous name frequency list" as used here refers to a list that can be used to determine the relative frequency of one name component. One example is the U.S. 2000 Census Bureau surname list that shows the relative frequency of a last name in the U.S. An anonymous name frequency list is one type of name-based statistics.

"Naming convention" as used here refers to a convention whereby name components are combined in a specific order to construct the user name of an email address. For example, using the naming convention "first name followed by last name", a person named "John Doe" is assigned the email address "johndoe@domainname". A naming convention may abbreviate certain name components to a single letter. A naming convention may omit certain name components. Using the naming convention "first name followed by last initial", a person named "John Doe" is assigned the email address "johnd@domainname". In this example, the last name is abbreviated and the middle name is omitted. Some naming conventions join the name components with punctuation characters like the period character. For example, using the naming convention "first name dot last name", a person named "John Doe" may be assigned the email address "john.doe@domainname". Naming conventions also have to consider the situation where two people in the organization have substantially similar names. When there are multiple people with the exact same first name and last name in an organization, a naming convention may append digits or add the middle name to the user name. For example, if the email address "johndoe@domainname" is already in use by a person "John Doe", the next person named "John Doe" may be assigned the email address "johndoe2@domainname" or "johnsamdoe@domainname" where "Sam" is the middle name.

"Single-segment naming convention" as used here refers to a naming convention where name components are concatenated together without any punctuation character in between the name components so the user name consists of one single string segment with no obvious syntactic boundaries to separate the name components. For example, "johndoe@domainname" and "doejohn@domainname" are email addresses constructed with single-segment naming conventions.

"Multi-segment naming convention" as used here refers to a naming convention where name components are concatenated together with punctuation character in between the name components so the user name consists of multiple string segments separated by punctuation characters. For example, "john.doe@domainname" and "doe.john@domainname" are email addresses constructed with multi-segment naming conventions.

DETAILED DESCRIPTION

The present disclosure makes the following observation: Email addresses often follow some naming conventions where the user name contains portions of the owner name. Many people voluntarily choose free personal email addresses by combining parts of their names as the user name. Most organizations including companies, government departments and universities enforce rules where email addresses are assigned using one of a finite list of naming conventions.

In the case of a user name with punctuation characters, i.e., the user name is constructed using a multi-segment naming convention, a computer can split the email address user name into string segments by the punctuation characters. The challenge is that there are several popular naming conventions with different ordering of name components and a computer cannot determine which string segment belongs to which name component. For example, a computer can split the user name "john.doe" into "John" and "doe" but the computer cannot determine which of "John" and "doe" is the first name because the computer lacks the knowledge that "John" is a popular first name. In the case of a user name without punctuation characters, i.e., the user name is constructed using a single-segment naming convention, the challenge is compounded because the string length of each name component is not obvious to a computer. For example, a human being can recognize "John" as a popular first name and be able to split the user name "johndoe" into "John" as the first name and "doe" as the last name. However, a computer cannot determine how to split the user name "johndoe" because it lacks the knowledge that "John" is a popular first name and the first name consists of the first four letters of the user name.

The present disclosure also makes the following observation: There are anonymous name frequency lists that can confirm the validity of name components but not the identity or existence of any specific individual. Several governments make these lists readily available to the general public. For example, the U.S. Census Bureau publishes a frequency list of male given names, female given names and surnames covering 90% of the U.S. population from its 1990 and 2000 census. A computer can first apply all naming conventions to a user name, generate all name component permutations, use the anonymous name frequencies to calculate the inverse probability of each permutation and select the most likely permutations as approximations of the email address owner name with indications of the relative likelihood of each permutation. These generated names are referred to as "approximate owner names" for the rest of this document.

Identification of an Approximate Full Name

In one embodiment, the present disclosure provides a method for analyzing an email address. In one aspect, the method entails, in a first step, isolating the user name from the email address. As provided, email address syntax standards are thoroughly documented and designed in such a way that the user name portion can be readily extracted in an automated manner. In one aspect, for instance, all characters preceding the symbol "@" is considered the user name of the email address.

Next, one or two or three or more strings are extracted from the user name, which, in combination, represent a candidate full name of the owner of the email address. In one aspect, when two or more strings are extracted, the user name can simply be divided at a certain point. As described later, at each iteration of the evaluation of a candidate full name comprised of name components, the dividing point can be shifted to generate different permutations of strings. Extraction of the strings to represent name components can be tailored based on naming conventions, which are illustrated in FIGS. 1 and 2.

FIG. 1 shows a list of single-segment naming conventions. Table 101 is a list of two-component single-segment naming conventions. Table 102 is a list of three-component single-segment naming conventions.

FIG. 2 shows a list of multi-segment naming conventions. Table 201 is a list of two-component multi-segment naming conventions. Table 202 is a list of three-component multi-segment naming conventions. Table 203 shows a list of punctuation characters that are often used to separate the name components.

The tables in FIG. 1 and FIG. 2 can be customized to add or remove naming conventions to adapt to different cultures and usage patterns. The columns weight and minFNC ("minimum full name components") are configurable parameters used in the computation of composite scores in step 796 as described in FIG. 8D.

Extracted string or strings, which represent possible name components, can be compared to a table (see, e.g., FIGS. 3 and 4) comprising a plurality of real world name components. Optionally, the table includes, for each real world name component, a use frequency. By virtue of such comparison, a use frequency for each string can be obtained.

FIG. 3 shows the surname list from the U.S. 2000 Census. File 301 shows the top part of the surname file including the ten most frequent surnames. The surname is in the first data field, the number of people with the surname is in the $3^{rd}$ data field and the frequency per 100000 is in the $4^{th}$ data field. The ethnic origin probabilities are in the $6^{th}$ through $11^{th}$ data fields. The full data file contains the last names of 90% of the U.S. population. Descriptions of data fields are also provided in FIG. 3.

FIG. 4 shows the given name lists from the U.S. 1990 Census. File 401 shows the top part of the female given name file including the ten most frequent female given names. File 402 shows the top part of the male given name file including the ten most frequent male given names. In both files the given name is in the first data field and the relative frequency is in the $2^{nd}$ data field. The full data files contain the given names of 90% of the U.S. population. Descriptions of data fields are also provided in FIG. 4.

Based on the use frequencies obtained from the last step, the method of the present disclosure calculates a likelihood score for the candidate full name to be a real world full name.

In one aspect, the calculation of the likelihood score further employs a name recognition algorithm. Name recognition systems are build with knowledge of different cultures and can analyze any email address in any country to return a score of the validity of a name as well as the relative frequency of a full name or a name component. One example is the IBM InfoSphere Global Name Management system. Like the anonymous name frequency lists, these systems can confirm the validity of names or name components but not the identity or existence of any specific individual. These name recognition systems provide programmatic interfaces so that a computer can query such systems to generate a score of the name permutations generated.

Thereafter, the above steps starting from extraction of strings can be repeated, and likelihood scores for a plurality of candidate full names each as a combination of different strings obtained by extracting one or more different strings from the user name.

It is noted that certain email user names contain special characters, such as the dot (".") or an underscore sign ("_"). It is likely that such special characters are used to divide components of a name. Therefore, in one aspect, the calculation of the likelihood score further comprises increasing the likelihood score if the two or more strings are separated by a special character. In one aspect, the special character is a dot (".") or an underscore sign ("_").

It is also recognized that, even within a same culture, people may at will change the order of their name components in an email address. That is, a U.S. user may choose to place his first name before his last name, or vise versa. Thus, in one aspect, a likelihood score is calculated for each order of combining the strings and each of the strings is compared to a table comprising a plurality of real world name components and, for each real world name component, a use frequency for the name component to be used at the position corresponding to the position of the string in the combination. Accordingly, in one aspect, the likelihood score of the candidate full name is the highest likelihood score among the likelihood scores calculated for all different orders of combining the strings.

Still further, digits and non-conventional characters are used in email user names are typically are not part of a person's name. In one aspect, the method further removes digits and/or non-conventional characters from the user name.

As such, an approximate full name of the owner of the email address can be identified as the candidate full name, from the plurality of candidate full names, that has the highest likelihood score.

The approximate owner names can be used for various purposes. For example, if a website provides the option to enter both the first and last name and the email address during user registration, the website can generate the approximate owner names from the email address to cross check with the first and last name to look for potential typing mistakes and flag them for confirmation.

Further Verification of the Approximate Full Name with a Profile Database

The present disclosure also makes the following observation: The approximate owner names can be further improved to uniquely identify a person. Many profile directories (e.g., Hoover's) and social networks (e.g., LinkedIn) provide professional profiles including full names, industries, affiliated organizations and job titles. These directories can be searched by the first name, last name and organization name but not by the email address. An approximate email address owner name can be combined with the organization name derived from the email address domain name to search these directories. If the combination is unique enough, the search will return a single profile and the identity of the owner can be resolved with any missing name component filled in from the full name of the returned profile. The attributes of all profiles found for an email address list can be aggregated and extrapolated for the entire email address list population. For example, the number of people in each industry can be tabulated from the found profiles and then extrapolated. The statistical confidence level of the extrapolated results can be calculated using the number of found profiles as the statistical sample size and the number of email addresses in an email address list as the statistical population size.

In one aspect, the method of the present disclosure further comprises querying a profile database with the identified approximate full name, wherein the profile database comprises profiles for a plurality of persons.

In another aspect, the query is further conducted with the domain name extracted from the email address or the name of an organization associated with the domain name. As each domain name must be registered with a domain registration service, the organization associated with a domain name can typically be found by looking up the domain registration service's database.

In any of these aspects, a match between the identified approximate full name and an entry in the database further confirms the validity of the identified approximate full name.

In another aspect, the method further comprises querying a demographic database with the matched profile of the identified approximate full name to obtain demographic statistics. In yet another aspect, the method further comprises querying a demographic database with the name components of the identified approximate full name to obtain demographic statistics.

Statistics of an Email List

The present disclosure also makes the following observation: Whether the exact owner identity is resolved or not, aggregated demographic statistics, geographic statistics and other anonymous statistics can be estimated for the email address list population. For example, the U.S. 2000 Census provides ethnic origin probabilities of a surname. If an approximate owner name includes a full last name, the last name can be used as the search key to retrieve the ethnic origin distribution of the owner. In another example, some census data in Great Britain provide geographical location probability distribution of a last name. If an approximate owner name includes a full last name, the last name can be used as the search key to retrieve the geographic location probability distribution of the owner. The search results of all email address owner last names can be aggregated and then extrapolated for the entire email address list population. The statistical confidence level of the extrapolated results can be calculated using the number of found last names as the statistical sample size and the number of email addresses in an email address list as the statistical population size. Another example is the U.S. 1990 Census given name lists that provide the gender distribution of a given name. If an approximate owner name includes a full first name, the first name can be used as the search key in the given name lists to compute the gender probability distribution. The results can be aggregated and then extrapolated to estimate the gender ratio of the entire email address list population. The statistical confidence level of the extrapolated results can be calculated using the number of found given names as the statistical sample size and the number of email addresses in an email address list as the statistical population size.

In one embodiment of the present disclosure anonymous name frequency lists are used to calculate probabilities of name components. An email address list operator submits an email address list to the system. The method extracts the user name from each email address, applies every applicable naming convention and name component string length permutation on the user name to generate a list of name component combinations. For each combination generated, the method searches each name component in anonymous name frequency lists. If no name component of a combination exists then the combination is considered impossible and discarded. If the name component is found in the anonymous name frequency lists, the method retrieves the relative frequency of the name component and adds the name component combination to a candidate list. After every name component combination has been processed the method compares the name component frequencies of all candidates and returns the most likely candidate as the best approximation of the email address owner name. The approximate owner names are then searched in a profile directory to resolve any ambiguity. The improved owner names are then searched in a name-based statistics data source to generate name-based statistics. After all email addresses have been processed, the accumulated profile data and name-based statistics are aggregated and returned with the owner names to the email address list operator.

The advantages of the present disclosure include, without limitation, a much shorter time to have the system up and running. The present disclosure does not require the construction of a database of email addresses because the anonymous name frequency lists and the name recognition software systems described here are immediately available.

The advantages of the present disclosure further include, without limitation, the low cost to keep the system up-to-date. The anonymous name frequency lists in the given examples are updated infrequently and, even when they are updated, it is easy to update these lists using the approach of the present disclosure. The present disclosure does not require the continuous effort to look up different data sources in order to keep a database of email addresses up-to-date.

The advantages of the present disclosure further include, without limitation, the avoidance of privacy issues. The present disclosure does not require installation of any online tracking technology like web browser cookies or collection of personal information without user consent.

Detailed Description of Exemplary Processes

Various embodiments of the present disclosure are now described with reference to the drawings, wherein like reference numerals are used to refer to like elements throughout. In the following description, for purposes of explanation, numerous specific details are set forth in order to provide a thorough understanding of the subject disclosure. It may be evident, however, that the present disclosure may be practiced without these specific details. In other instances, well-known structures and devices are shown in block diagram form in order to facilitate describing the present disclosure.

FIG. 5 is a block diagram illustrating one embodiment of the present disclosure. Computer system 502 is a computer that includes a central processing unit (CPU), random-access memory (RAM) and storage devices such as magnetic disks all connected by a bus. Optionally it may include computer network interfaces and input-output devices such as keyboard and monitor. Furthermore computer system 502 may consist of multiple computers connected via computer networks to share the workload. Software modules 503, 504, 506, 509, 512 and 513 may be implemented as part of one stand-alone executable program, multiple stand-alone executable programs, embedded as parts of other executable programs or any combination thereof. Tables 101, 102, 201, 202, 203, 510 and name lists 301, 401, 402 can be stored as files in storage devices, in a database management system, as data structures stored in random-access memory or as resources identified by universal resource identifiers (URI) over a computer network.

List processing module 503 provides a programmatic interface where an email address list can be submitted and a human-computer interface where a human being can submit an email address list using input-output devices like keyboards and displays. When list processing module 503 receives email address list 501 from email address list operator 500, it parses the list into individual email addresses. Each email address is then sent as email address 507 to email address parsing module 504. After processing is complete, as described below, owner statistics list 515 is returned to list processing module 503 where the list is accumulated. List processing module 503 then sends the next email address to email address parsing module 504. When all email addresses of email address list 501 have been processed, list processing module 503 copies all accumulated owner statistics list 515 to analysis report 517. The profile data and the statistics data of all accumulated owner statistics list 517 are then aggregated into summary statistics and appended to analysis report 517. List processing module 503 delivers analysis report 517 to email address list operator 500 via a programmatic interface or a human-computer interface. List processing module 503 is now ready to receive the next email address list for processing.

Email address parsing module 504 parses email address 507 received from list processing module 503, extracts the user name from the email address according to email address syntax standards and generates name combination list 505 containing a list of name component combinations that are allowed by any of the applicable naming conventions. After all name component combinations have been generated, name combination list 505 is sent to name lookup module 506. Email address parsing module 504 is described in further detail in FIG. 7A.

Name lookup module 506 fetches each record from name combination list 505 and searches for each component in anonymous name frequency lists. In this embodiment anonymous name frequency lists comprise of name lists 301, 401 and 402. If none of the name components is found, the name combination is rejected. If at least one name component is found, a composite score is calculated using the relative frequencies of the found name components such that the higher the composite score the more likely the name combination. The computation of composite score should also consider the naming convention used (by checking the naming convention ID in the name combination record) and the number of name components found. The composite score and the name components are then added as one record in candidate list 508. After all records of name combination list 505 have been processed, candidate list 508 is sent to candidate selection module 509.

Candidate selection module 509 calculates the relative composite score of all candidates in candidate list 508 and sorts the remaining candidates by their relative composite scores. Depending on the values in configuration table 510, only the top candidate is selected or all candidates that meet a threshold are selected. The name components and the relative composite scores of the selected candidates are added to owner name list 511. After all records of candidate list 508 have been processed, owner name list 511 is sent to profile lookup module 513.

Profile directory 520 is a directory of person profiles that provides a programmatic interface to search for people by name and, optionally, information about an organization that the person is associated with. Hoover's professional directory is an example of profile directory 520. The directory often allows searching without all the name components of a person, e.g., search can be performed with only the last name. Every directory provides different profile details and no directory can provide the correct profile of every person at all times. Nonetheless the information provided by these directories can provide useful insight about the email address owner.

Profile lookup module 513 tries to eliminate ambiguity and enrich information in owner name list 511 by using profile directory 520. Profile lookup module 513 uses the name components of the owner names and the organization name derived from the email address to search for profile in profile directory 520. If owner name list 511 contains multiple records for one email address, profile lookup module 513 tries every record to see if one and only one of the records produces a unique match in profile directory 520. If so all other records are eliminated. The profile data retrieved from profile directory 520 are also passed in owner profile list 514. After all records of owner name list 511 have been processed, owner profile list 514 is sent to statistics lookup module 512. If profile directory 520 is not available, profile lookup module 513 copies all records from owner name list 511 to owner profile list 514 without profile data.

Statistics data source 521 is a name-based statistics data source. The purpose of using statistics data source 521 is to generate aggregate statistics for the email address list by looking up statistics of each approximate owner name and then aggregate the statistics found. As the email address list size grows, the aggregated statistics tend to be more accurate due to the law of large numbers. One example of statistics data source 521 is the U.S. 2000 Census surname file where an ethnic origin probability distribution can be found for a last name.

Statistics lookup module 512 receives owner profile list 514 and uses the name components of each owner profile record to search in statistics data source 521. In the example of the U.S. 2000 Census surname file, the last name is used to retrieve an ethnic origin probability distribution. The owner profile record is copied to owner statistics list 515. The ethnic origin probability distribution found is copied to the statistics data field of the record in owner statistics list 515. After all records of owner profile list 514 have been processed, statistics lookup module 512 sends owner statistics list 515 to list processing module 503.

If statistics data source 521 is not available, statistics lookup module 512 handles it the same way as if no statistics is found and copies all records from owner profile list 514 to owner statistics list 515 without statistics data. After all records of owner profile list 514 have been processed, owner statistics list 515 is returned to list processing module 503.

After all records of email address list 501 have been processed, list processing module 503 sends analysis report 517 to email address list operator 500.

Figure 6A:
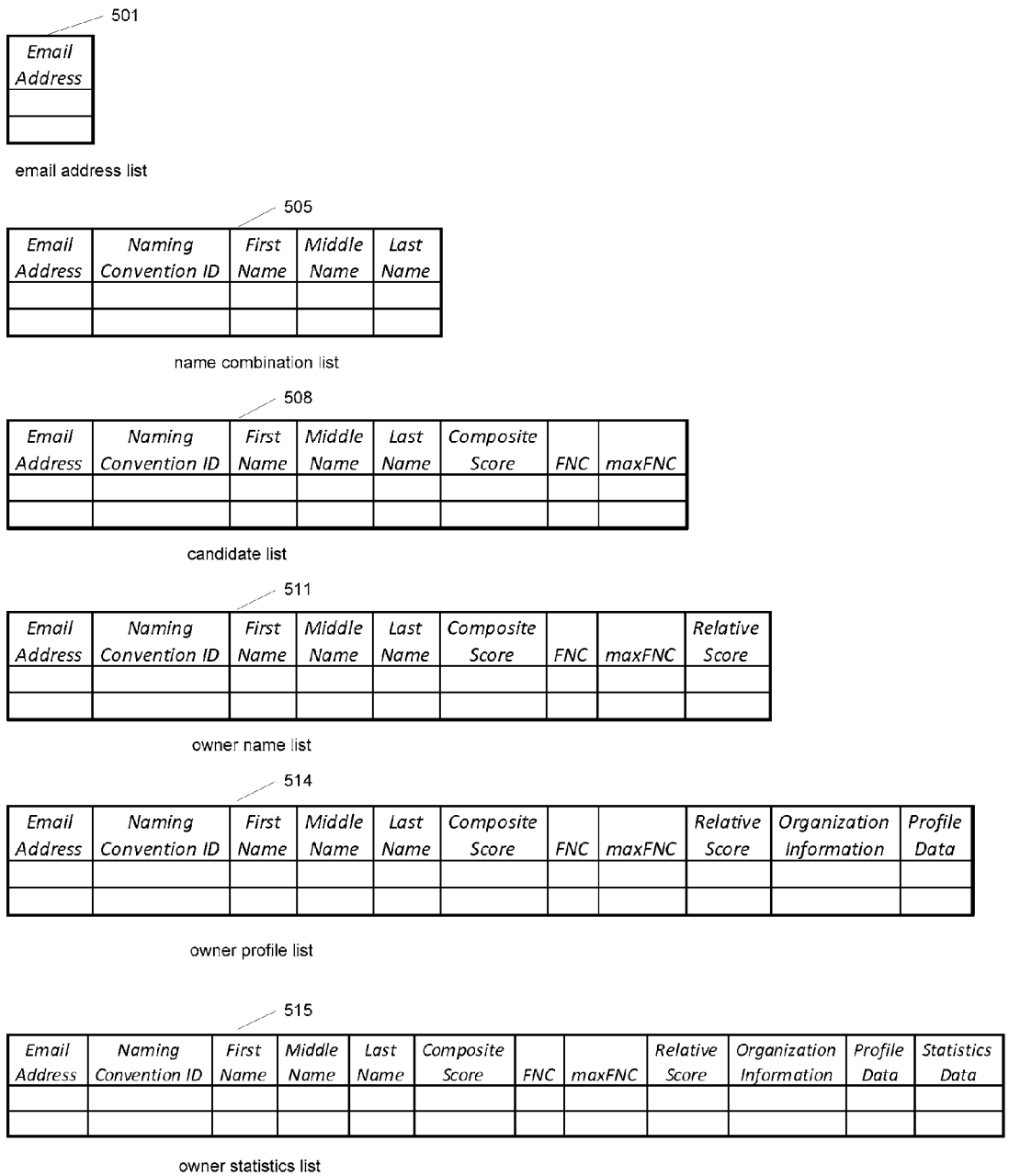
FIG. 6A and FIG. 6B show details of the data structures referenced in FIG. 5.
Figure 6B:
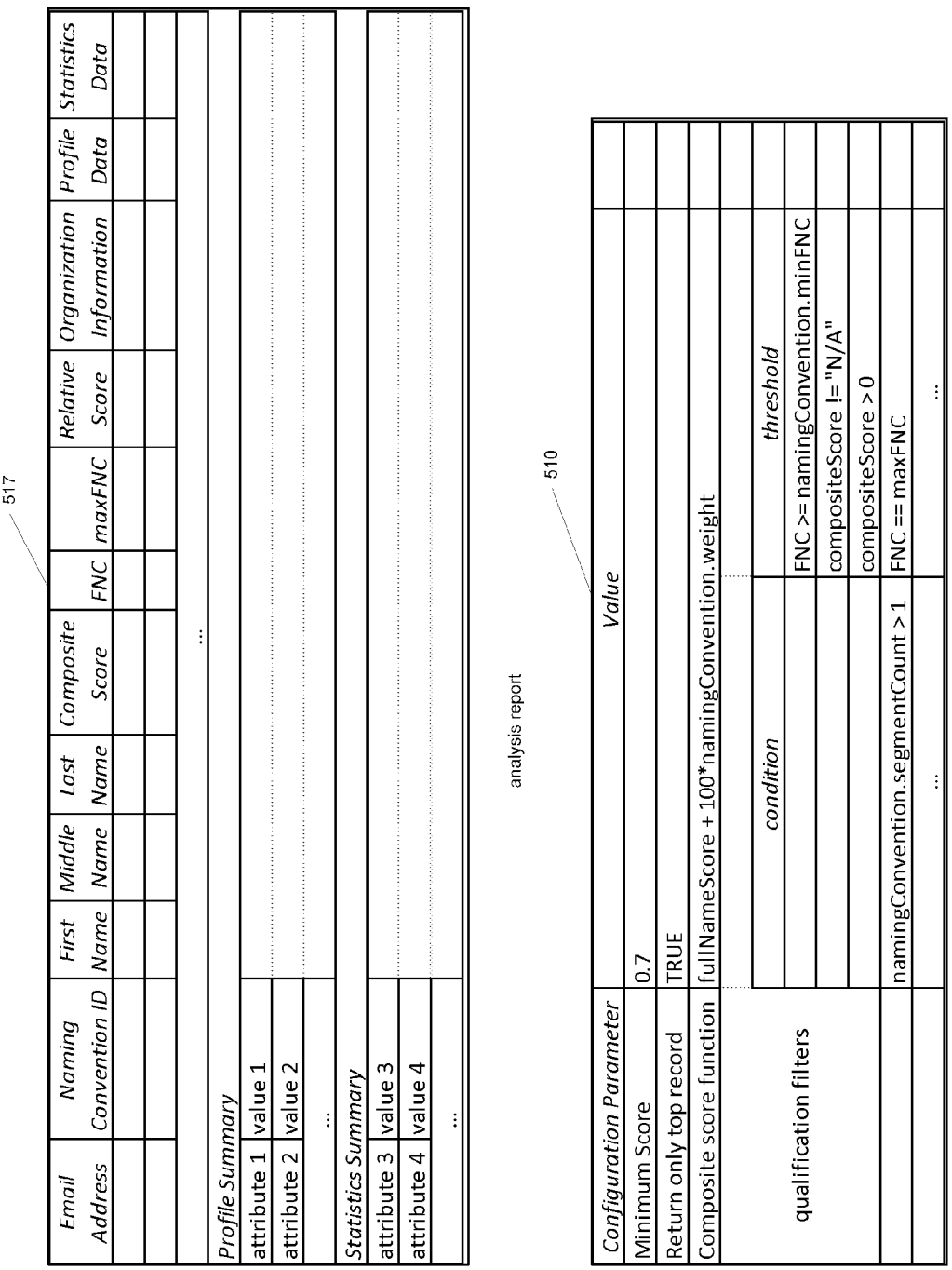

FIG. 6A shows the data structures of email address list 501, name combination list 505, candidate list 508, owner name list 511, owner profile list 514 and owner statistics list 515. FIG. 6B shows the data structures of analysis report 517. These lists are visually represented as tables where each row of a table represents a record in the list and each cell of a row represents an attribute of the record. Each cell can contain a simple data value like a string or a complex data structure. The records carry more information as data travels through stages of processing. The column name FNC, abbreviation for "full name components", is the number of full (non-abbreviated and non-empty) name components found in name lookup module. The column maxFNC is the highest value of FNC of all records of the same email address.

The first section of analysis report 517 comprises of information copied from owner statistics list 515. The profile summary section aggregates various attributes from the profile data of email address owners. The statistics summary section aggregates various attributes from the statistics data of email address owners.

FIG. 6B also shows configuration table 510. The parameter values of configuration table 510 control the behavior of various modules. The values can be customized to adapt to different cultures and usage patterns.

Figure 6C:
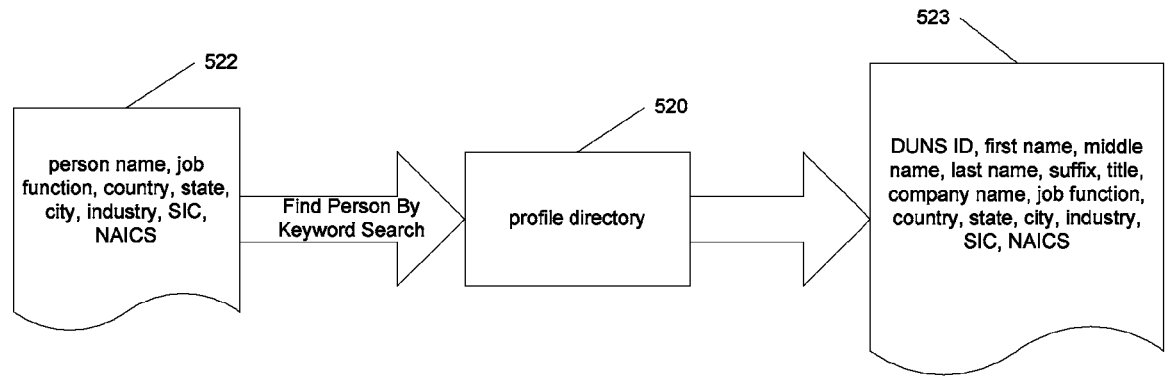
FIG. 6C is a conceptual description of the profile directory programmatic interface in the embodiment shown in FIG. 5.

FIG. 6C is a conceptual description of the programmatic interface of profile directory 520. This description is based on Hoover's "Find Person by Keyword Search" SOAP programmatic interface. This description shows the relevant input parameters 522 and the relevant output parameters 523. Other input and output parameters (e.g., parameters for sorting and navigation) are not shown. Note that the input parameter "person name" "should be a name of a person or part of a name and most of the input parameters are optional.

Figure 7A:
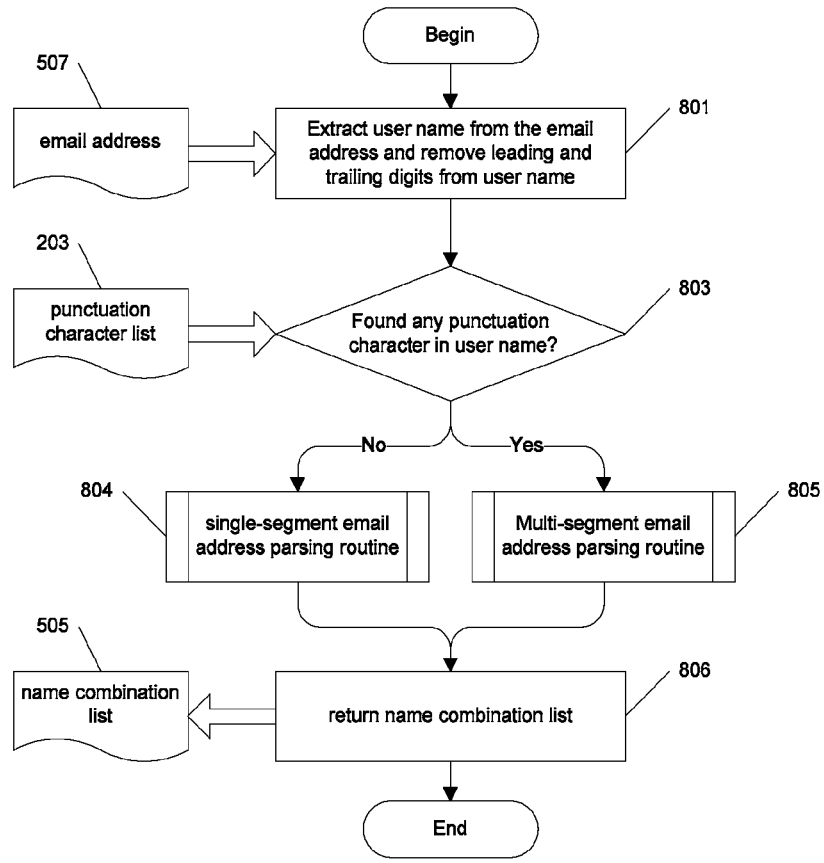
FIG. 7A is a flow diagram of an exemplary email address parsing module.

FIG. 7A is a flow diagram of email address parsing module 504. Step 801 parses email address 507 to extract the user name by applying all known email address syntax rules. Step 801 also removes leading and trailing digits from the user name. Step 803 checks if any character from the punctuation character list 203 is found in the user name. If no punctuation character is found, the user name is passed to single-segment email address parsing routine 804 for processing. If at least one punctuation character is found, the user name is passed to multi-segment email address parsing routine 805 for processing. Both routines return a name combination list for step 806 to return as name combination list 505 which will be processed by name lookup module 506.

Figure 7B:
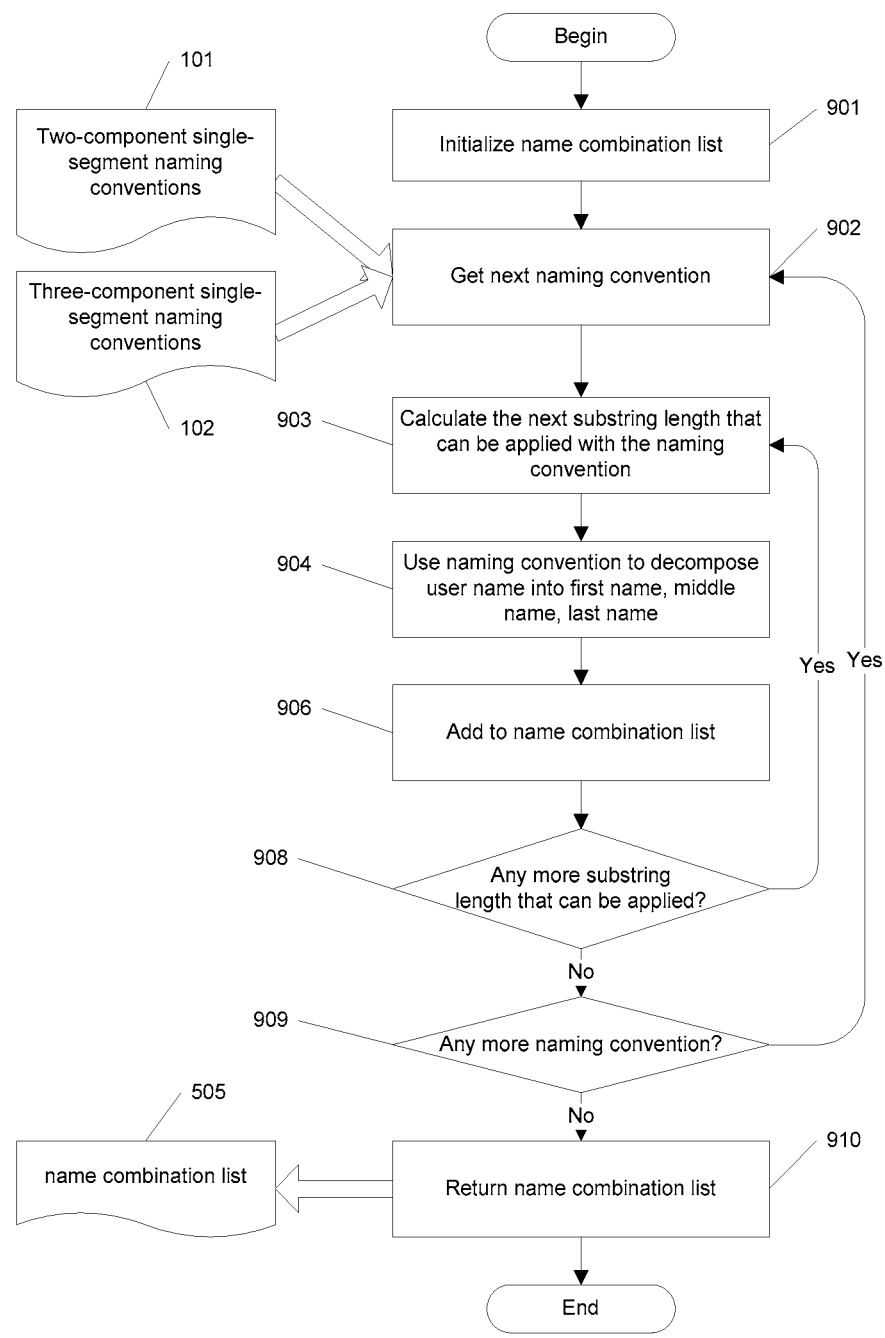
FIG. 7B is a flow diagram of an exemplary single-segment email address parsing routine.

FIG. 7B is a flow diagram of the single-segment email address parsing routine 804, which is invoked from step 803 of email address parsing module 504 with a user name as input parameter. Step 901 receives a single-segment user name as input data and initializes name combination list 505. Step 902 retrieves the next single-segment naming convention ID from table 101 and 102. Since single-segment naming conventions only specify the order of the name components and not the length of each component, step 903 calculates the range of possible name component string length permutations that the current naming convention allows and selects the next allowed name component string length permutation. Step 904 uses the name component string length permutation to parse the user name into name components according to the current naming convention. All name components are stripped of non-alphabetic characters. Name components omitted in the selected naming convention will be assigned empty strings as values. Step 906 adds a record comprising the ID of the naming convention applied and all name component string values to name combination list 505. Step 908 checks if there is any more name component string length permutation that can be applied under the current naming convention. If so, processing loops back to step 903 to get the next permutation. Otherwise processing continues to step 909 to check if there is any more single-segment naming convention that can be applied. If there are more naming conventions then processing loops back to step 902 to get the next naming convention. Otherwise processing continues to step 910 and returns name combination list 505 as the output of this routine.

Figure 7C:
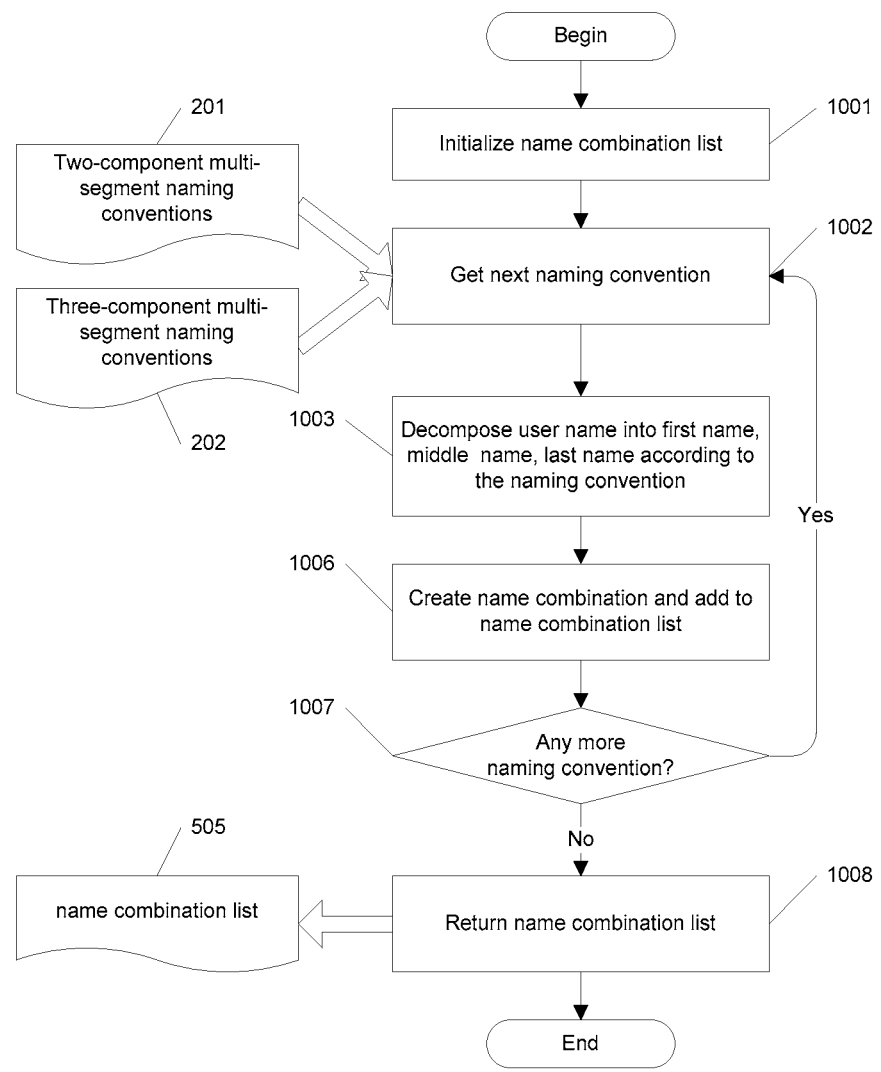
FIG. 7C shows a flow diagram of an exemplary multi-segment email address parsing routine.

FIG. 7C shows a flow diagram of multi-segment email address parsing routine 905, which is invoked from step 803 of email address parsing module 504 with a user name as input parameter. Step 1001 initializes name combination list

505 and splits the user name into string segments at the punctuation characters. If the user name has two segments, step 1002 looks for the next record from two-component multi-segment naming convention 201. If the user name has three segments, step 1002 looks for the next record from three-component multi-segment naming convention 202. If some of the string segments have only one character, step 1003 only selects from naming conventions that have an abbreviate name component corresponding to the string segment. For example, if the user name is "j.s.doe", only naming convention NC3M03 is selected because it is the only multi-segment naming convention with abbreviation in segment one and segment two. Step 1003 then maps each string segment to a name component according to the selected naming convention. Name components omitted in the selected naming convention will be assigned empty strings as values. Step 1006 adds a record comprising the ID of the naming convention applied and all name component string values to name combination list 505. Step 1007 checks if there is any more multi-segment naming convention that can be applied. If there is more, processing loops back to step 1002 to get the next naming convention. Otherwise processing continues to step 1008 which returns name combination list 505.

Figure 8A:
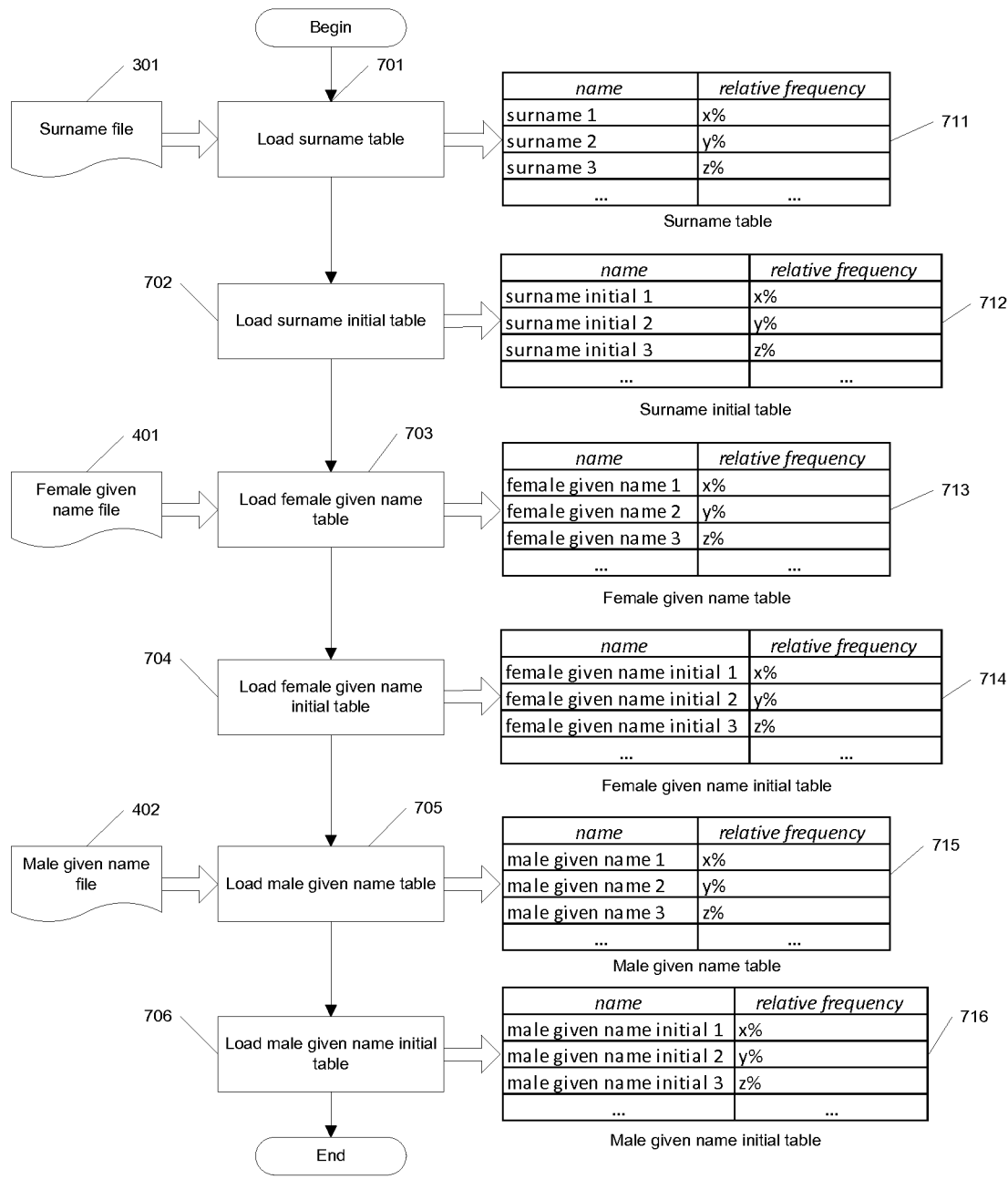
FIG. 8A is a flow diagram of an exemplary initialization of name lookup module.

FIG. 8A is a flow diagram of the initialization of name lookup module 506. This initialization sequence can be executed every time name lookup module 506 is used, only the first time it is used or during installation of the module. Step 701 reads surname file 301 and divides the prop100k field ($4^{th}$ data field on each row) by 100000 to compute the relative frequency of each surname. The surname from the first data field and the relative frequency are then inserted into surname table 711. Step 702 loops through each letter in the alphabet and sums the relative frequencies of all surnames with the same initial letter as the relative frequency of the surname initial. The surname initial and its relative frequency are then inserted into surname initial table 712. Step 703 reads female given name file 401 and divides the freq field ($2^{nd}$ data field on each row) by 100 to compute the relative frequency of each given name. The given name and its relative frequency are then inserted into female given name table 713. Step 704 loops through each letter in the alphabet and sums the relative frequencies of all given names with the same initial letter as the relative frequency of the given name initial. The given name initial and its relative frequency are then inserted into female given name initial table 714. Step 705 and step 706 repeats a similar process to read male given name file 402 and create male given name table 715 and male given name initial table 716.

Figure 8B:
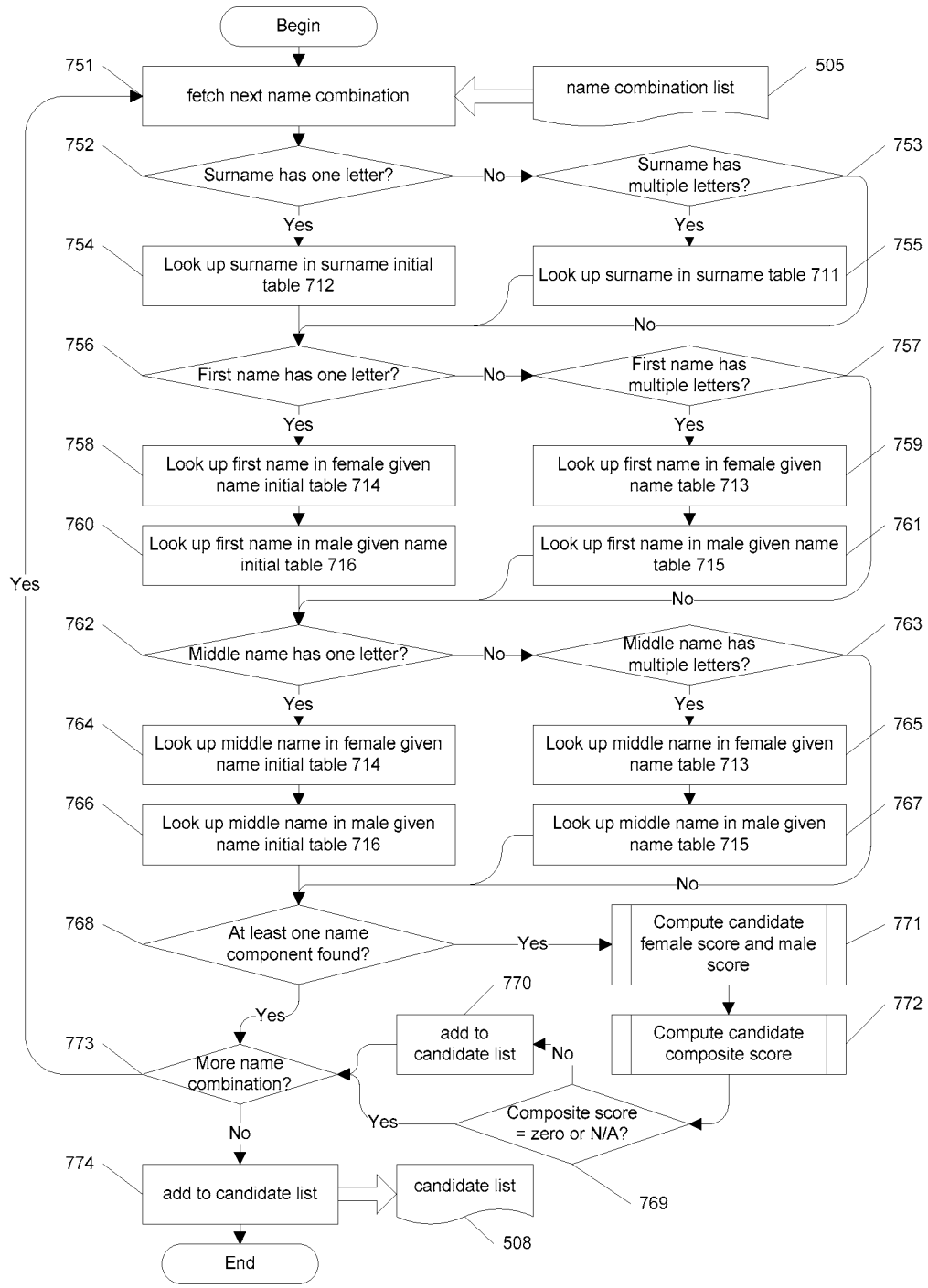
FIG. 8B is a flow diagram of an exemplary look up operation of name lookup module.

FIG. 8B is a flow diagram of the look up operation of name lookup module 506. Step 751 fetches the next name combination from name combination list 505 received from email address parsing module 504. If surname is non-empty, steps 752-755 searches for the surname in either surname initial table 712 or surname table 711 and records the relative frequency if found. If first name is non-empty, steps 756-761 searches for the first name in either female given name initial table 714 and male given name initial table 716, or female given name table 713 and male given name table 715. If the first name is found, its relative frequency is recorded. If middle name is non-empty, steps 762-767 performs a similar search for the middle name and record the relative frequency if found. If at least one name component has been found step 771 calculates the female score and the male score. Step 772 calculates a composite score using the female score and the male score and other information as described in FIG. 8D. Step 769 checks the composite score to see if the score is not zero or "N/A". If not, step 770 adds a record with the name components, number of full name components found ("FNC") and the composite score in candidate list 508. When there is no more name combination to be processed, the maximum value of FNC in all candidate records is calculated and stored in the maxFNC field of every candidate record. Candidate list 508 is then returned.

Figure 8C:
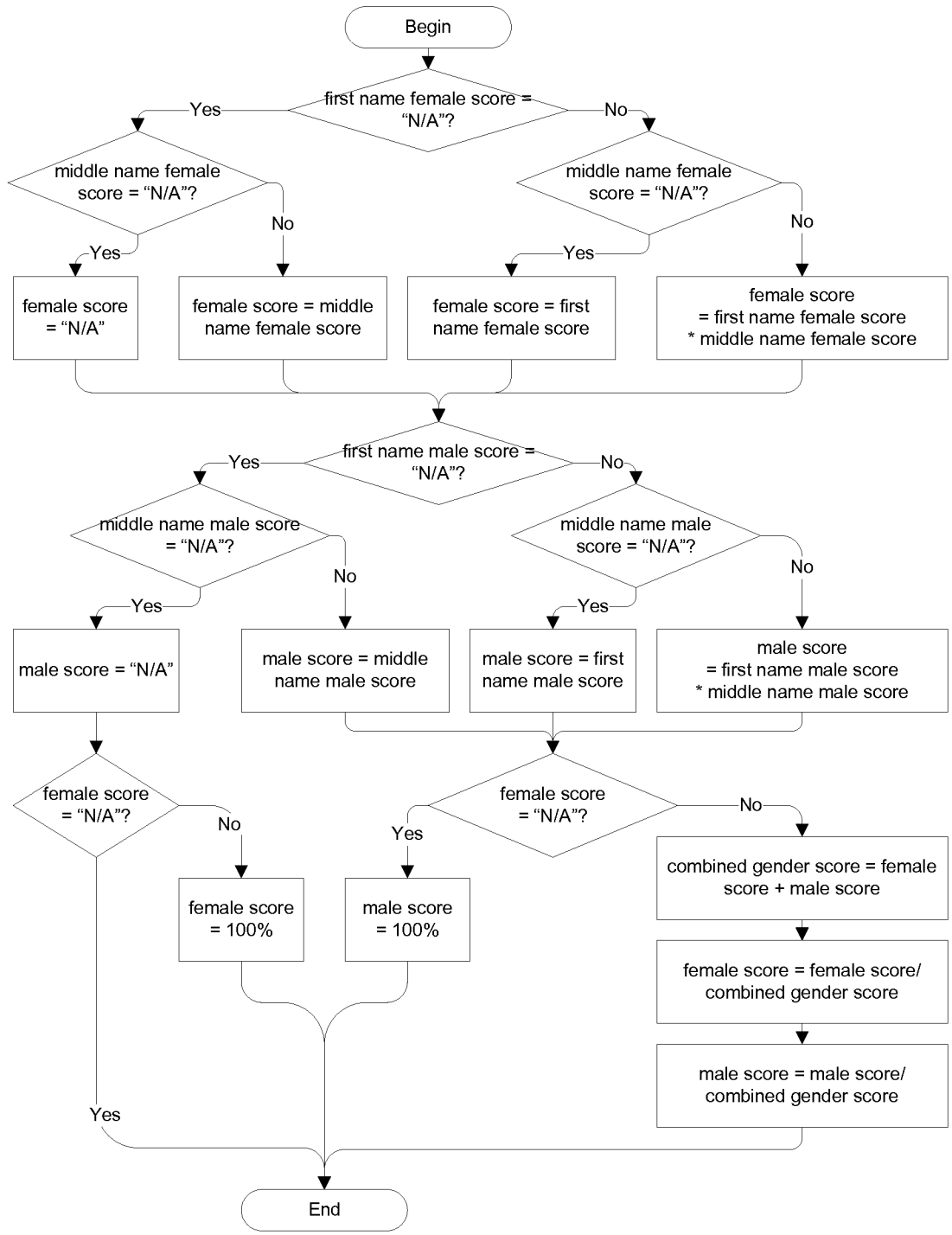
FIG. 8C is a flow diagram illustrating calculation of female score and male score.

FIG. 8C is a flow diagram of step 771 which calculates the female score and male score. The purpose of the calculation is to adjust female score and male score so they add up to 100%. The female score and male score are set to "N/A" if they cannot be determined.

Figure 8D:
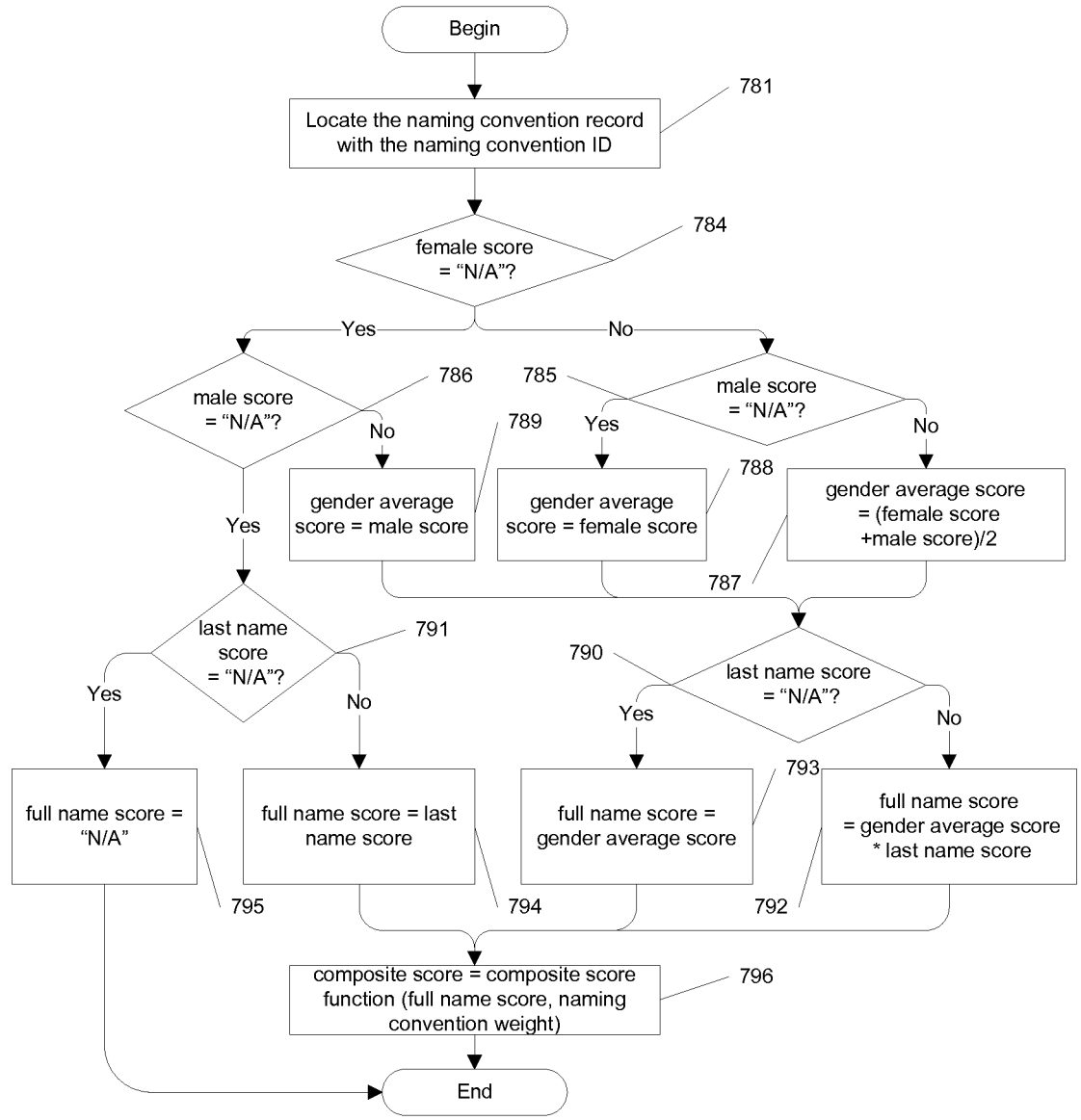
FIG. 8D is a flow diagram illustrating computation of the composite score.

FIG. 8D is a flow diagram of step 772 which computes the composite score. A candidate with a higher composite score is more likely to be the correct answer. The composite score is set to "N/A" if there is insufficient information. Computation of the composite score takes into consideration three major factors: the number of full name components found, the relative frequency of the name components found and the naming convention used to parse the user name into naming components. Step 781 continues from step 771 to calculate the composite score of a name combination. Step 781 retrieves the name convention record from one of the naming convention tables. Steps 784-795 compute the full name score using the female score, male score and last name frequency. If the composite score is not "N/A" step 796 computes the composite score by applying the composite score function in configuration table 510 with the full name score and the weight in the naming convention record as function parameters. The composite score is then returned.

Figure 9:
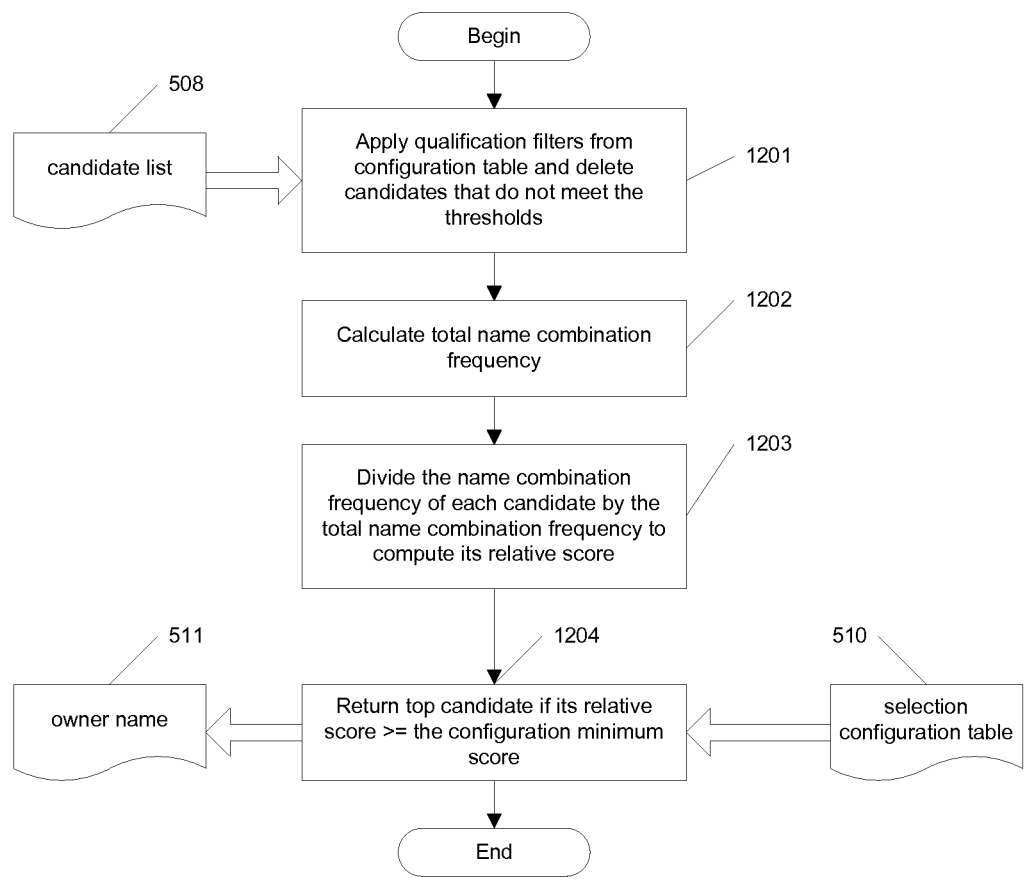
FIG. 9 is a flow diagram of a candidate selection module of an embodiment.

FIG. 9 is a flow diagram of candidate selection module 509. Step 1201 applies the qualification filters of configuration table 510 to every candidate. The qualification filters is an ordered array of condition-threshold pairs. For each candidate record in the list, step 1201 loops through each condition in the qualification filters in the order they appear in configuration table 510. Each condition is applied to the variables associated with the candidate record and, if the condition is satisfied, the threshold will be checked. If the condition is an empty string the threshold will always be checked. The threshold is a Boolean expression where the variables are the variables of the current naming combination. If the threshold expression evaluates to Boolean false, the threshold is not met and the candidate record is deleted from the candidate list. Step 1202 calculates the total composite score by adding the composite score of all candidates in candidate list 508. Step 1203 calculates a relative score for each candidate by dividing its composite score by the total composite score. Step 1204 removes all candidates with relative score less than the minimum score in configuration table 510. If Return Only Top Record of configuration table 510 is true, only the remaining candidate with the highest score is returned in owner name list 511. Otherwise all remaining candidates are returned in owner name list 511.

Figure 10:
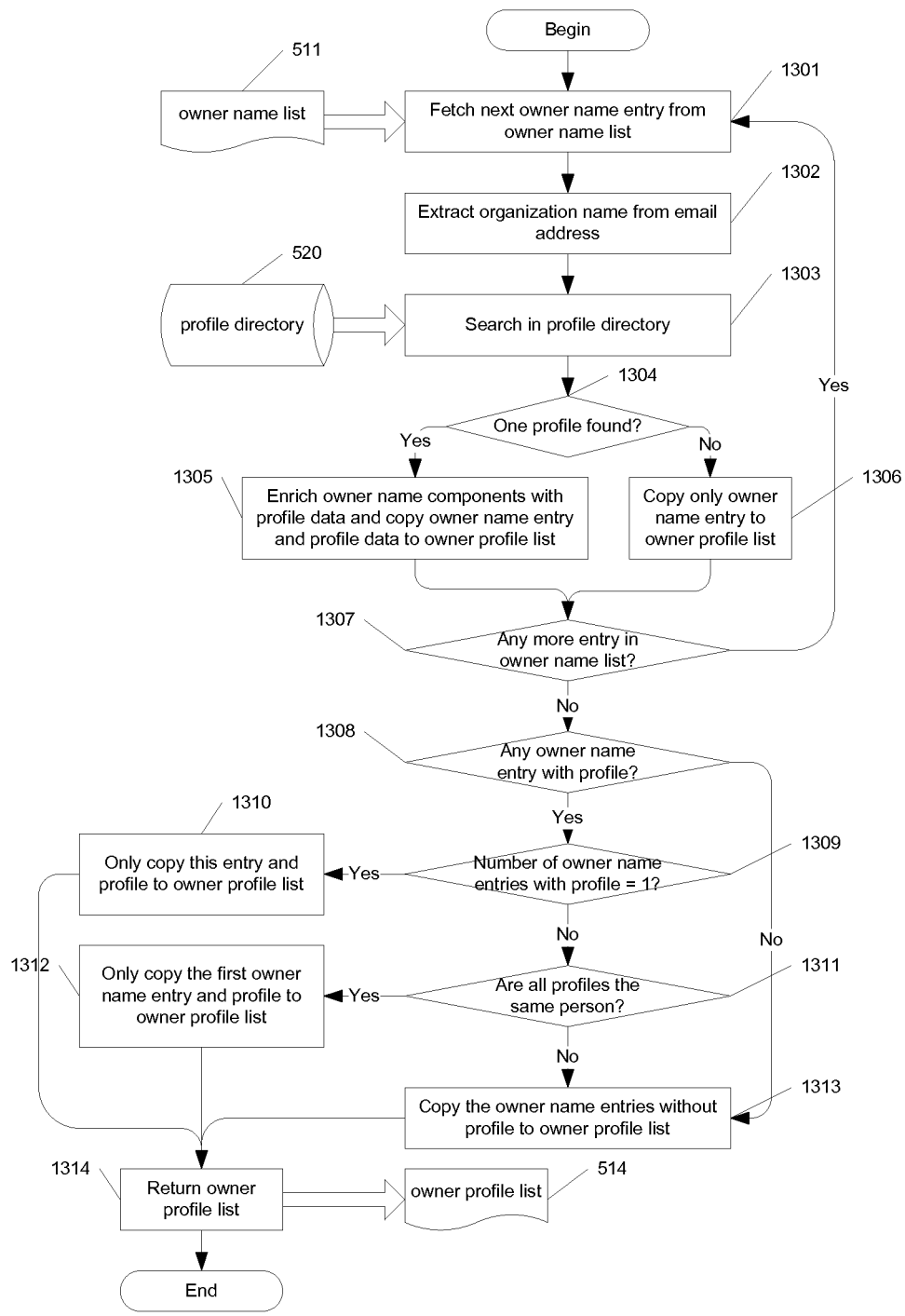
FIG. 10 is a flow diagram of a profile lookup module of an embodiment.

FIG. 10 is a flow diagram of profile lookup module 513. If owner name list 511 is empty step 1301 returns an empty owner profile list 514. Otherwise step 1301 fetches the next owner name record from owner profile list 514. Step 1302 extracts the organization name from the email address of the owner name record using email address syntax standards. If the email address is in SMTP syntax, the email address domain name is the string following the "@" character. Step 1302 uses the whois protocol (IETF RFC 3912) to look up the organization name of the domain name. If the email address is in X.400 syntax, the organization name is the string following the "/O=" element.

Step 1303 uses the first name and last name from the owner name record and the organization name to search profile directory 520 by using the "Find Person by Keyword Search" programmatic interface as shown in FIG. 6C. The credentials to access profile directory 520 can be provided in different ways. For example, email address list operator 500 can provide credentials when submitting email address list or computer system 502 can have stored credentials in some configuration file. Note that owner name record may not have a full first name and full last name. If profile directory 520 is not available, step 1303 handles it the same way as when no profile is found in the directory and continues to step 1304.

Step 1304 checks if the search returns one profile. If so, the owner name record is probably valid and the found person profile is saved in a temporary location and associated with the owner name record. The organization name used in the search is also associated with the owner name record. If any name component of the owner name record is empty, the corresponding name component from the found person profile is copied over to the owner name record. If the search results in no profile or multiple profiles, the owner name cannot be confirmed. Any found person profile is not saved and Step 1306 copies only the information in the owner name entry to owner profile list 514.

After all owner name records in owner name list 511 have been processed, step 1308 checks if no owner name record is associated with profile data, an empty owner profile list 514 is returned and the profile lookup module processing is complete. Otherwise step 1309 counts the owner name records that have associated profile data. If one and only one owner name record has associated profile data, step 1310 copies that owner name record and its associated profile data and organization name to owner profile list 514 and returns an owner profile list 514 with only one record. If multiple owner name records have associated profile data, step 1311 checks if the associated profiles are the same person. If so the first owner name record and its associated profile data and organization name are copied to owner profile list 514 which is returned in step 1314. If multiple associated profiles belonging to different people are found, all owner name records are copied to owner profile list 514 without any associated profile. Owner profile list 514 is then returned by step 1314.

The flow diagram in FIG. 10 shows that if profile directory 520 is not available, profile lookup module 513 generates owner profile list 514 containing information from owner name list 511 without any profile data.

Figure 11:
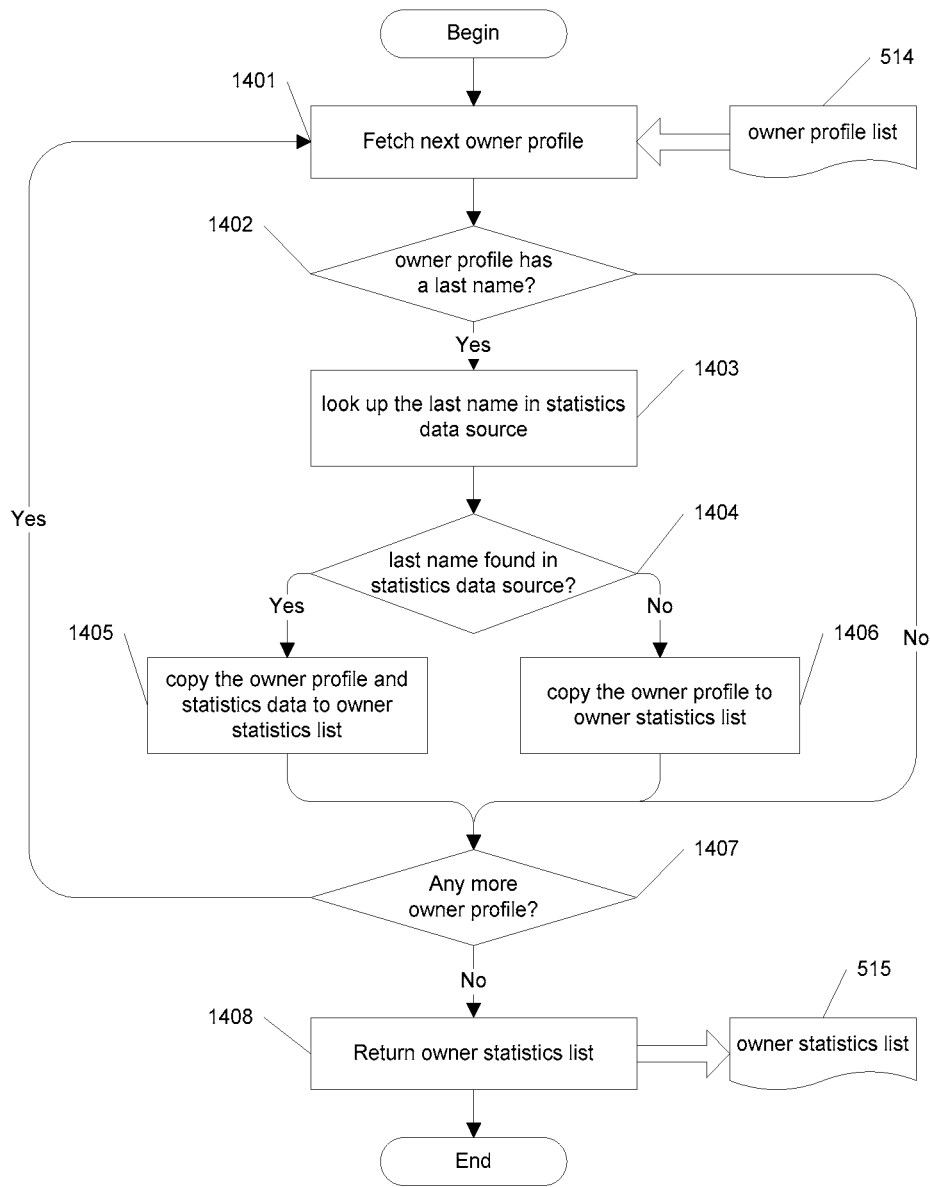
FIG. 11 is a flow diagram of an exemplary statistics lookup module.

FIG. 11 is a flow diagram of statistics lookup module 512. If owner profile list 514 is empty then step 1401 returns an empty owner statistics list 515. Otherwise step 1401 fetches the next owner profile from owner statistics list 515. If the owner profile does not have a full last name, i.e., a last name with more than one letter, processing skips forward to step 1407 to check for the next owner profile. If the owner profile has a full last name, step 1403 looks for the last name in statistics data source 521. If the last name is found, the owner profile and the statistics data are copied to owner statistics list 515. If the last name is not found, only the owner profile is copied to owner statistics list 515. After all owner profiles in owner profile list 514 have been processed, owner statistics list 515 is returned.

Figure 12:
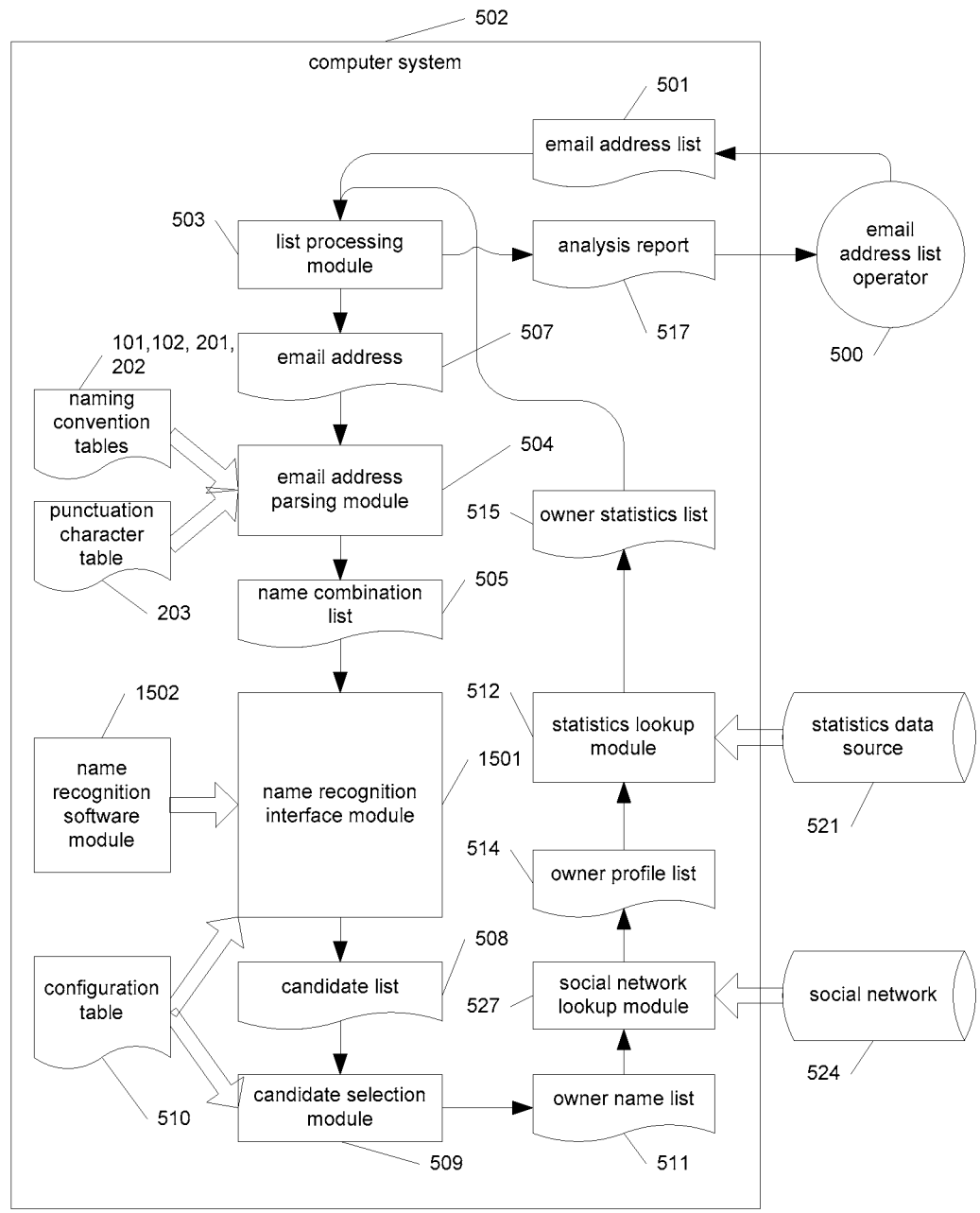
FIG. 12 is a block diagram illustrating another embodiment of the present disclosure.

FIG. 12 is a block diagram illustrating another embodiment of the present disclosure. There are two major differences between this embodiment and the previous embodiment in FIG. 5. The first major difference is that name recognition interface module 1501 and name recognition software module 1502 in this embodiment replace name lookup module 506 and name files 301, 401 and 402 in the previous embodiment. In this embodiment, name recognition software module 1502 is a third-party module of proprietary nature where its knowledge sources and its search algorithms are not freely available to the general public. Name recognition software module 1502 provides programmatic interfaces to analyze names. When name recognition interface module 1501 receives name combination list 505 from email address parsing module 504, it calls the programmatic interface of name recognition software module 1502, gets the data and returns candidate list 508. The second major difference is that social network 524 and social network lookup module 527 in this embodiment replace profile directory 520 and profile lookup module 513 in FIG. 5. Social network 524 is a third-party product that provides a programmatic interface to search people by name. An example of social network 524 is LinkedIn (http://www.linkedin.com) that provides a REST API for people search. Note that although LinkedIn has the member email addresses, it does not allow for searching by member email addresses either through its API or on its web site. Social network lookup module 527 serves the same purpose as profile lookup module 513 in FIG. 5 but is calling the social network API instead.

Figure 13:
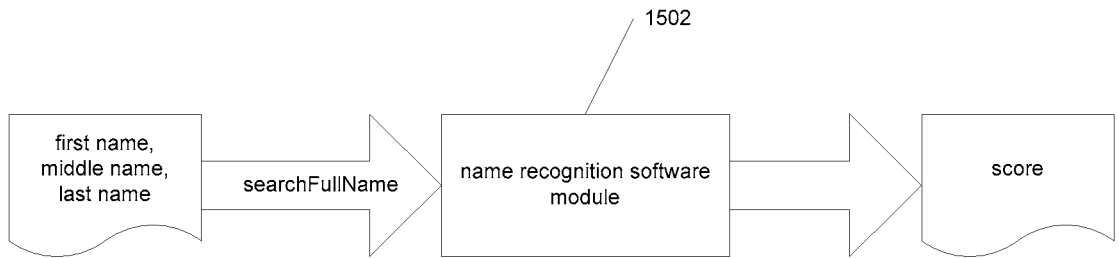
FIG. 13 is a conceptual description of the name recognition software module programmatic interface in the embodiment shown in FIG. 12.

FIG. 13 is an illustration of the functionality of the programmatic interfaces provided by name recognition software module 1502. This is a general description of the interface and the exact implementation is different for each name recognition system. The interface is described as function calls in the figure although the described functionality may be exposed as public functions, remote procedure calls, web services, REST or any other programmable interface depending on the name recognition system.

Figure 14:
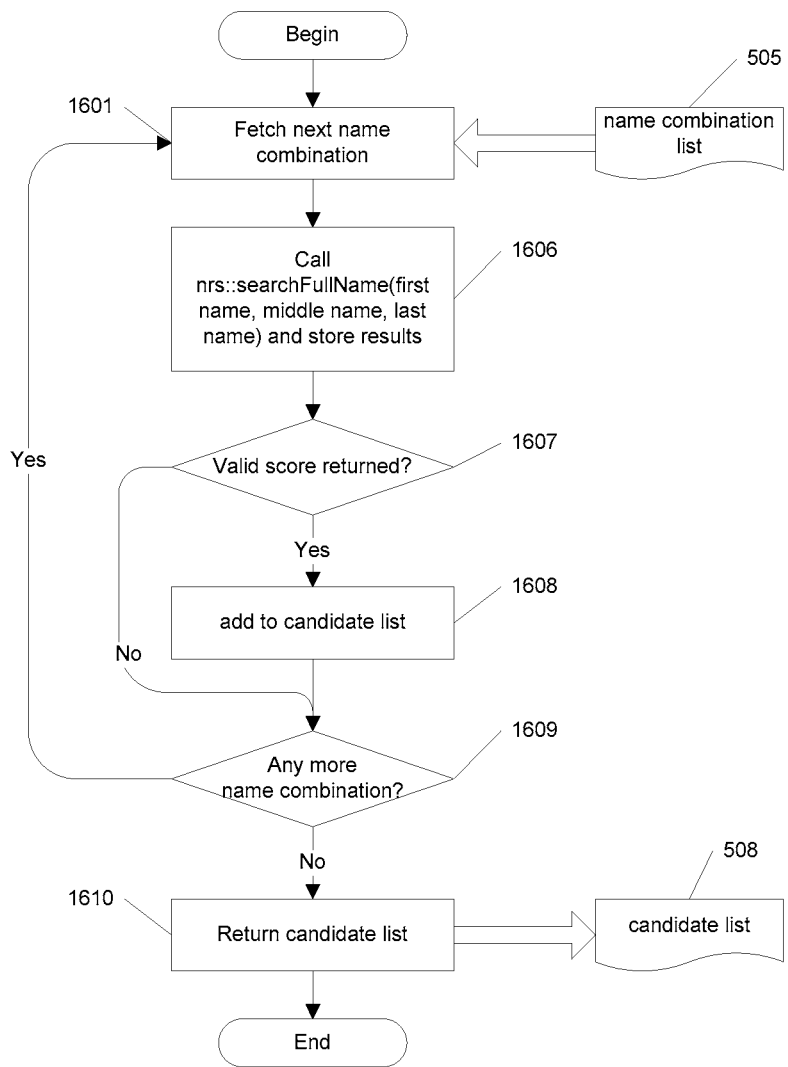
FIG. 14 is a flow diagram of name recognition interface module which is part of the embodiment shown in FIG. 12.

FIG. 14 is a flow diagram of name recognition interface module 1501. If name combination list 505 is empty, step 1601 returns an empty candidate list 508. Otherwise step 1601 fetches the next name combination from name combination list 505. Step 1606 passes the first name, middle name and last name of the name combination and invokes the searchFullName function of name recognition software module 1502 which responds with a numeric score. Step 1607 checks if the received score means the name combination is valid. If the score means the name combination is valid, step 1608 adds a record in candidate list 508 with name components of the name combination and the received score as the composite score. If the score means the name combination is invalid, the name combination is not added to candidate list 508. When there is no more name component to be processed, candidate list 508 is returned in step 1610.

Figure 15:
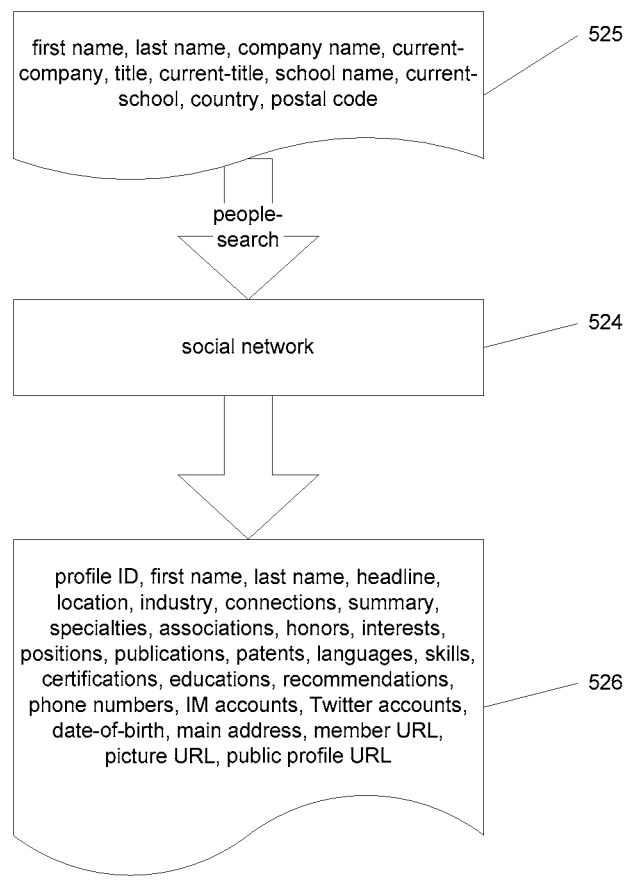
FIG. 15 is a conceptual description of the programmatic interface of social network which is part of the embodiment shown in FIG. 12.

FIG. 15 is a conceptual description of the programmatic interface of social network 524. This description is based on the LinkedIn "people-search" REST application programmatic interface. This description shows the relevant input parameters 525 and the relevant output parameters 526. Other input and output parameters (e.g., parameters for sorting and navigation) are not shown. Note that most of the input parameters are optional and not all output parameters will be returned for every member found.

Figure 16:
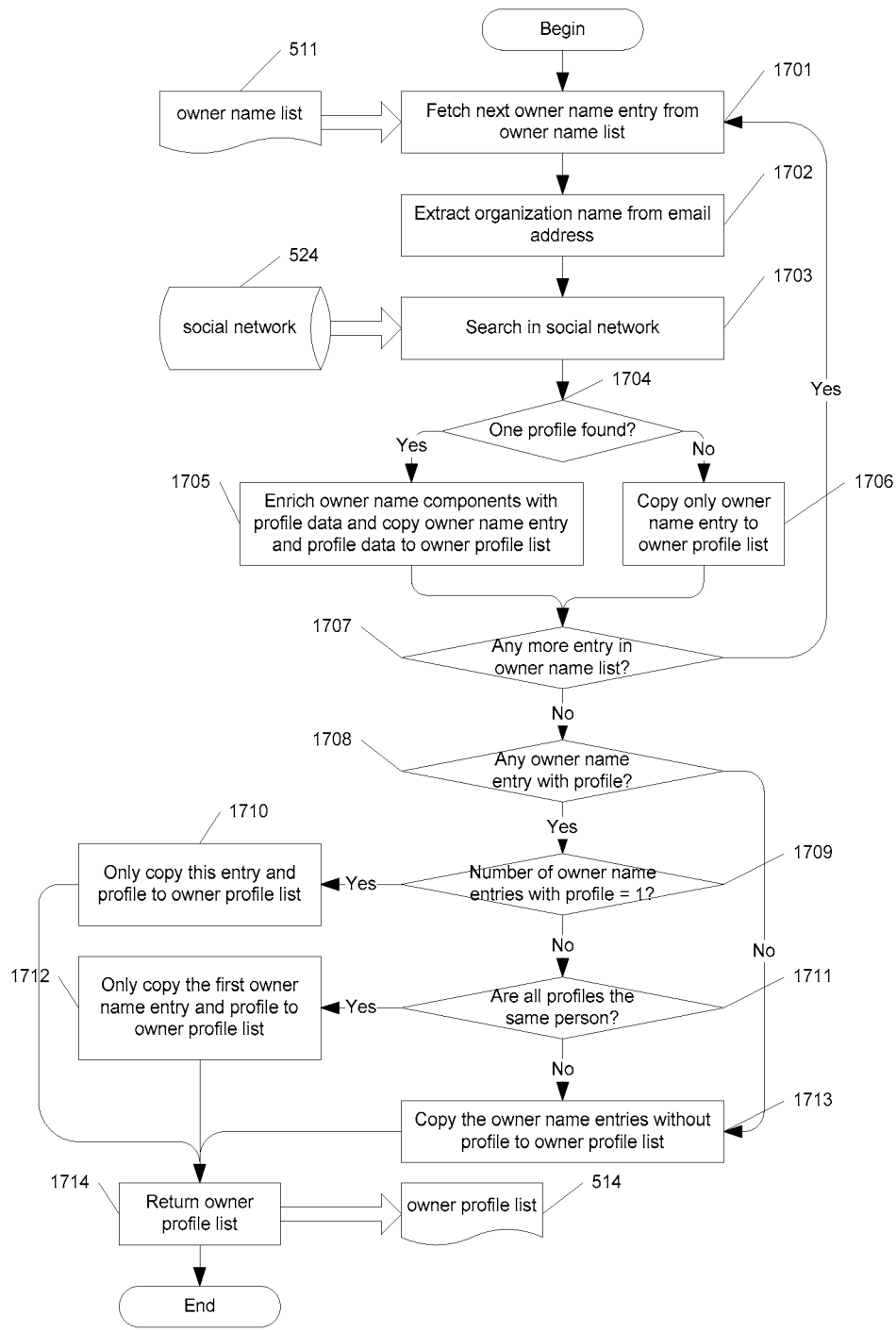
FIG. 16 is a flow diagram of social network interface module which is part of the embodiment shown in FIG. 12.

FIG. 16 is a flow diagram of social network lookup module 527. This module is almost identical to profile lookup module 513 except that step 1703 uses the "people-search" programmatic interface of social network 524 shown in FIG. 15. The credentials to access social network 524 can be provided in different ways. For example, email address list operator 500 can provide credentials when submitting email address list or computer system 502 can have stored credentials in some configuration file.

Computer Network and Access to Information

It will be appreciated by the knowledgeable reader that systems and methods of the present disclosure can be implemented on any computer network. In some aspect, information exchange over the computer network is carried out through secure data communication. Methods and devices for providing secure data communication are well known in the art.

Embodiments can include program products comprising non-transitory machine-readable storage media for carrying or having machine-executable instructions or data structures stored thereon. Such machine-readable media may be any available media that may be accessed by a general purpose or special purpose computer or other machine with a processor. By way of example, such machine-readable storage media may comprise RAM, ROM, EPROM, EEPROM, CD-ROM or other optical disk storage, magnetic disk storage or other magnetic storage devices, or any other medium which may be used to store desired program code in the form of machine-executable instructions or data structures and which may be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, logics, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, mini-computers, mainframe computers, and so on. Embodiments of the invention may also be practiced in distributed and cloud computing environments where tasks are performed by local and remote processing devices that are linked (either by hard-wired links, wireless links, or by a combination of hardwired or wireless links) through a communications network. In a distributed computing environment, program modules may be located in both local and remote memory storage devices.

It should be noted that although the discussions herein may refer to a specific order and composition of method steps, it is understood that the order of these steps may differ from what is described. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

Unless otherwise defined, all technical and scientific terms used herein have the same meaning as commonly understood by one of ordinary skill in the art to which this invention belongs.

The inventions illustratively described herein may suitably be practiced in the absence of any element or elements, limitation or limitations, not specifically disclosed herein. Thus, for example, the terms "comprising", "including," "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed.

Thus, it should be understood that although the present invention has been specifically disclosed by preferred embodiments and optional features, modification, improvement and variation of the inventions embodied therein herein disclosed may be resorted to by those skilled in the art, and that such modifications, improvements and variations are considered to be within the scope of this invention. The materials, methods, and examples provided here are representative of preferred embodiments, are exemplary, and are not intended as limitations on the scope of the invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

In addition, where features or aspects of the invention are described in terms of Markush groups, those skilled in the art will recognize that the invention is also thereby described in terms of any individual member or subgroup of members of the Markush group.

All publications, patent applications, patents, and other references mentioned herein are expressly incorporated by reference in their entirety, to the same extent as if each were incorporated by reference individually. In case of conflict, the present specification, including definitions, will control.

It is to be understood that while the disclosure has been described in conjunction with the above embodiments, that the foregoing description and examples are intended to illustrate and not limit the scope of the disclosure. Other aspects, advantages and modifications within the scope of the disclosure will be apparent to those skilled in the art to which the disclosure pertains.

The invention claimed is:
1. A method for analyzing an email address, comprising:
  (a) isolating the user name from the email address;
  (b) extracting one or more strings from the user name which, in combination, represent a candidate full name of the owner of the email address;

(c) comparing each of the one or more strings to a table comprising a plurality of real world name components and, for each real world name component, a use frequency, thereby obtaining a use frequency for each string;

(d) calculating a likelihood score for the candidate full name to be a real world full name, which calculation takes the use frequencies obtained from step (c) as input;

(e) repeating steps (b)-(d) to generate likelihood scores for a plurality of candidate full names each as a combination of different strings obtained by extracting one or more different strings from the user name; and (f) identifying the candidate full name, from the plurality of candidate full names, that has the highest likelihood score as an approximate full name of the owner of the email address, wherein at least one of steps (a)-(f) is performed by a computer.

2. The method of claim 1, wherein the calculation of the likelihood score comprises the use of a name recognition algorithm.

3. The method of claim 1, wherein the calculation of the likelihood score further comprises increasing the likelihood score if the two or more strings are separated by a special character.

4. The method of claim 3, wherein the special character comprises a dot (".") or an underscore sign ("_").

5. The method of claim 1, wherein a likelihood score is calculated for each order of combining the strings and each of the strings is compared to a table comprising a plurality of real world name components and, for each real world name component, a use frequency for the name component to be used at the position corresponding to the position of the string in the combination.

6. The method of claim 5, wherein the likelihood score of the candidate full name corresponds to the highest likelihood score among the likelihood scores calculated for all different orders of combining the strings.

7. The method of claim 1, further comprising, before step (b), removing digits and/or non-conventional characters from the user name.

8. The method of claim 1, further comprising querying a profile database with the identified approximate full name, wherein the profile database comprises profiles for a plurality of persons.

9. The method of claim 8, wherein the query is further conducted with the domain name extracted from the email address or the name of an organization associated with the domain name.

10. The method of claim 8, wherein a match between the identified approximate full name and an entry in the database confirms the validity of the identified approximate full name.

11. The method of claim 10, further comprising querying a demographic database with the matched profile of the identified approximate full name to obtain demographic statistics.

12. The method of claim 11, further comprising applying the steps to one or more email addresses of an email list, thereby generating demographic statistics for the email list.

13. The method of claim 11, wherein the demographic database comprises, for each name in the database, an ethnic origin probability, geographical location probability and/or gender probability.

14. The method of claim 1, further comprising querying a demographic database with the name components of the identified approximate full name to obtain demographic statistics.

15. The method of claim 1, further comprising applying the steps to one or more email addresses of an email list, thereby generating demographic statistics for the email list.

16. The method of claim 1, wherein in step (b) at least two strings are extracted from the user name.

17. The method of claim 16, wherein the strings are extracted by dividing the user name.

18. A computer system comprising a processor, memory and program code which when executed, configures the system to:

(a) isolate the user name from the email address;

(b) extract one or more strings from the user name which, in combination, represent a candidate full name of the owner of the email address;

(c) compare each of the two or more strings to a table comprising a plurality of real world name components and, for each real world name component, a use frequency, thereby obtaining a use frequency for each string;

(d) calculate a likelihood score for the candidate full name to be a real world full name, which calculation takes the use frequencies obtained from step (c) as input;

(e) repeat steps (b)-(d) to generate likelihood scores for a plurality of candidate full names each as a combination of different strings obtained by extracting one or more different strings from the user name; and (f) identify the candidate full name, from the plurality of candidate full names, that has the highest likelihood score as an approximate full name of the owner of the email address.

19. The computer system of claim 18, wherein in step (b) at least two strings are extracted from the user name.

* * * * *